United States Patent
Mori et al.

[19]

[11] Patent Number: 5,825,984
[45] Date of Patent: Oct. 20, 1998

[54] IMAGE FORMATION SYSTEM

[75] Inventors: Hirotaka Mori; Ryo Ando, both of Ebina, Japan

[73] Assignee: Fuji Xerox Co., Ltd., Tokyo, Japan

[21] Appl. No.: 749,961

[22] Filed: Nov. 18, 1996

[30] Foreign Application Priority Data

Nov. 20, 1995 [JP] Japan .................................. 7-301382

[51] Int. Cl.$^6$ .................................................. G06K 15/00
[52] U.S. Cl. .......................................... 395/105; 395/104
[58] Field of Search ................................. 395/101, 104, 395/105, 117, 111; 358/526, 498; 399/26, 51, 66, 49, 208, 76; 347/115, 116, 232, 233, 234, 236, 237, 246–248

[56] References Cited

U.S. PATENT DOCUMENTS 5,444,525  8/1995  Takahashi et al. ...................... 399/76
5,576,753  11/1996  Kataoka et al. ......................... 347/248

FOREIGN PATENT DOCUMENTS

| A-1-281468 | 11/1989 | Japan . |
| A-6-253151 | 9/1994 | Japan . |
| A-7-89892 | 4/1995 | Japan . |
| 7-89892 | 11/1996 | Japan . |

Primary Examiner—Arthur G. Evans
Attorney, Agent, or Firm—Oliff & Berridge, PLC

[57] ABSTRACT

An image formation system for forming a plurality of images different in color on a transfer material supported on an endless support rotated or directly on the endless support, thereby forming an image, and for forming color shift detection patterns on the endless support rotated, sampling the color shift detection patterns, and performing predetermined control operation, characterized in that color shift detection patterns for detecting cyclic rotation change occurring in the image formation system are provided.

9 Claims, 29 Drawing Sheets

FIG. 15A

C = 3Hz
(CASE WHERE AMPLITUDE OF BOTH A AND B CANNOT BE IGNORED)

| A (Hz) | B (Hz) | SAMPLING FREQUENCY (Hz) |
|---|---|---|
| 50 | 25 | 25 |
| 50 | 30 | 10 |
| 30 | 20 | 10 |

FIG. 15B (CASE WHERE AMPLITUDE OF B CAN BE IGNORED WITH RESPECT TO A, C)

| A (Hz) | C (Hz) | SAMPLING FREQUENCY (Hz) |
|---|---|---|
| 50 | 5 | 50, 25 |
| 20 | 3 | 20, 10 |
| 5 | 0.5 | 5, 2.5 |

IMAGE FORMATION SYSTEM

BACKGROUND OF THE INVENTION

1. Field of the Invention

This invention relates to a registration control system for detecting a color shift component of a differently colored image formed by each image formation means and correcting the color shift component in a multiple image formation system comprising a plurality of image formation means, such as a tandem color copier or color printer. More particularly, the invention relates to an image formation system which enables precise detection of a so-called AC vibration component, a periodical change component occurring in the image formation means, etc.

2. Description of the Related Art

In recent years, color printing of documents processed in offices, etc., has been rapidly increasing and image formation systems such as copiers, printers, and facsimiles for handling the documents have also been equipped with a color printing capability explosively. At present, the color machines tend to provide high image quality and operate at high speed with high quality and speedup of business processing in offices, etc. As color machines to meet such requirements, for example, various so-called tandem color image formation systems are already proposed and are also brought to the commercial stage. The tandem color image formation system comprises image formation units provided in a one-to-one correspondence with colors of black (K), yellow (Y), magenta (M), and cyan (C) and executes multiple transfer of differently colored images formed by the image formation units onto a transfer medium or an intermediate transfer body transported for forming a color image.

For example, the following is available as such a tandem color image formation system: As shown in FIG. 32, the tandem color image formation system comprises four image formation units of a black image formation unit 200K for forming a black (K) image, a yellow image formation unit 200Y for forming a yellow (Y) image, a magenta image formation unit 200M for forming a magenta (M) image, and a cyan image formation unit 200C for forming a cyan (C) image, which are spaced from each other at give intervals in horizontal placement. Placed below the black, yellow, magenta, and cyan color image formation units 200K, 200Y, 200M, and 200C is a transfer belt 202 as an endless transfer material support for transporting transfer paper 201 across transfer positions of the image formation units 200K, 200Y, 200M, and 200C with the transfer paper 201 electrostatically attracted on the belt.

The black, yellow, magenta, and cyan image formation units 200K, 200Y, 200M, and 200C are the same in configuration and form black, yellow, magenta, and cyan toner images respectively in sequence, as described above. Each of the image formation units 200K, 200Y, 200M, and 200C comprises a photosensitive drum 203. The surface of the photosensitive drum 203 is uniformly charged by an scorotron 204 for primary charge, then is scanned by and exposed to laser light 205 for image formation in response to image information for forming an electrostatic latent image. The electrostatic latent images formed on the surfaces of the photosensitive drums 203 are developed with black toner, yellow toner, magenta toner, and cyan toner by developing units 206 of the image formation units 200K, 200Y, 200M, and 200C to form visible toner images, which then are before-transfer charged by before-transfer chargers 207, then charged by transfer chargers 208 for transfer to the transfer paper 201 held on the transfer belt 202 in sequence.

The transfer paper 202 to which the black, yellow, magenta, and cyan toner images have been transferred is detached from the transfer belt 202, then is fixed by a fuser (not shown) for forming a color image.

In FIG. 32, numeral 209 denotes a photosensitive body cleaner, numeral 210 denotes a photosensitive body electricity removal lamp, numeral 211 denotes a paper stripping-off corotron, numeral 212 denotes a transfer belt electricity removal corotron, numeral 213 denotes a transfer belt cleaner, and numeral 214 denotes a cleaning preprocessing corotron.

By the way, the tandem color image formation system thus configured, which forms one image by using a plurality of image formation units, can form a color image at a fairly high speed. However, to speed up image formation, registration of images formed in the color image formation units, namely, color registration frequently worsens and the image quality cannot be maintained high. Thus, it is extremely difficult to make high image quality and speeding up compatible with each other, because change in internal temperature of the color image formation system or application of an external force to the color image formation system causes subtle change in the positions or sizes of the color image formation units themselves and furthermore subtle change in the positions or sizes of the parts in the color image formation units. The internal temperature change and external force are inevitable; for example, routine work such as a recovery from a paper jam, parts replacement in maintenance, or a move of the color image formation system applies an external force to the color image formation system.

For example, as disclosed in Japanese Patent Laid-Open No. Hei 1-281468, etc., an image formation system is already proposed which has a plurality of image formation sections each for forming a visible image corresponding to original image information and also a visible image of a position detection mark, a move member for moving and passing through in sequence transfer areas for transferring the visible images corresponding to original image information formed in the image formation sections or the visible images of the position detection marks, and position detection mark sense means being disposed downstream in the move direction of the move member in the transfer area for sensing the position detection marks transferred onto the move member, whereby the image formation sections are controlled so as to correct a transfer image shift based on a detection signal output from the position detection mark sense means.

To apply the transfer image shift correction technique to the tandem color image formation system shown in FIG. 32, as shown in FIG. 33, a plurality of color shift detection patterns 220K, 220Y, 220M, and 220C and 221K, 221Y, 221M, and 221C are formed on the full periphery of a transfer belt 202 at predetermined intervals along a travel direction of the transfer belt 202 and a direction perpendicular to the travel direction in the black, yellow, magenta, and cyan image formation units 200K, 200Y, 200M, and 200C and are sampled by a line light receiving element 222 such as a CCD sensor with a linear arrangement of a large number of light receiving pixels using transmitted light from a light transmitting element 223 and the spacing between the color shift detection patterns 220K, 220Y, 220M, and 220C and the spacing between 221K, 221Y, 221M, and 221C are calculated. The positions of the image formation units 200K, 200Y, 200M, and 200C and the image formation timing are corrected so that the spacings become equal to predetermined reference values, whereby high image quality is provided. The color shift detection patterns 220K, 220Y, 220M, and 220C and 221K, 221Y, 221M, and 221C formed on the transfer belt 202 are removed by a transfer belt cleaner 213 after they are sampled.

By the way, in the color image formation system thus configured, as shown in FIG. 33, predetermined color shift detection patterns 220K, 220Y, 220M, and 220C and 221K, 221Y, 221M, and 221C are formed on the full periphery of the transfer belt 202 by the image formation units 200K, 200Y, 200M, and 200C and are detected by the line light receiving element 222 such as a CCD sensor and the spacing between the color shift detection patterns 220K, 220Y, 220M, and 220C and the spacing between 221K, 221Y, 221M, and 221C are calculated. The positions of the image formation units 200K, 200Y, 200M, and 200C and the image formation timing are corrected so that the spacings become equal to predetermined reference values, whereby high image quality is provided.

However, the color image formation system involves the following problems: The color shift detection patterns 220K, 220Y, 220M, and 220C and 221K, 221Y, 221M, and 221C are formed on the full periphery of the transfer belt 202 containing a seam part 202*a*, as shown in FIG. 32, and are removed by the transfer belt cleaner 213 after they are sampled. At the time, since the seam part 202*a* of the transfer belt 202 has a minute level difference, it is difficult to completely remove the color shift detection patterns 220 and 221 formed on the seam part 202*a* of the transfer belt 202 by the transfer belt cleaner 213, and toner for forming the color shift detection patterns 220 and 221 remains on the seam part 202*a* of the transfer belt 202. If toner for forming the color shift detection patterns 220 and 221 thus remains on the seam part 202*a* of the transfer belt 202, when another color image is formed, the remaining toner is deposited on the rear face of transfer paper 201 held and transported on the transfer belt 202, causing the rear face to become dirty.

The color shift detection patterns 220K, 220Y, 220M, and 220C and between 221K, 221Y, 221M, and 221C are formed on the full periphery of the transfer belt 202 containing the seam part 202*a*. At the time, since the seam part 202*a* of the transfer belt 202 has a minute level difference as described above, density variations, a chip, etc., may occur in the color shift detection patterns 220 and 221 formed on the seam part; 202*a* of the transfer belt 202. If density variations, a chip, or the like thus exists in the color shift detection patterns 220 and 221 formed on the seam part 202*a* of the transfer belt 202, a detection error occurs when the color shift detection patterns 220 and 221 are detected by the line light receiving element 222.

The present applicant already proposes a sampling correction system in Japanese Patent Laid-Open No. Hei 6-253151. To control image sampling correction by control means, the sampling correction system sets the sampling start point and sampling width of the sampling control means, repeatedly generates registration shift measurement patterns, and integrates sampling data or arithmetic processing data for finding pattern positions; the sampling start point and sampling width of the sampling control means are set, etc., thereby improving detection accuracy of registration shift measurement patterns.

However, the prior art suffers from the following problem: The registration image sampling correction system of a multiple image formation system according to Japanese Patent Laid-Open No. Hei 6-253151 detects a color registration shift constant in size and direction caused by subtle change in the positions or sizes of the color image formation units themselves and furthermore subtle change in the positions or sizes of the parts in the color image formation units because of change in internal temperature of the color image formation system or application of an external force to the color image formation system (which will be hereinafter called "DC color registration shift"), and corrects the shift. The color registration shift also contains a color registration shift periodically changing in size and direction caused mainly by rotation bodies such as a photosensitive drum and a belt drive roll (which will be hereinafter called "AC color registration shift") in addition to the DC component. That is, the conventional color image formation system detects rotation change of the rotation body such as the photosensitive drum or belt drive roll by using an encoder attached to the rotation shaft of the photosensitive drum, etc., and feeds forward or back the rotation change of the photosensitive drum, etc., detected by the encoder into a drive motor for reducing the rotation change of the photosensitive drum, etc. However, if control is thus performed so as to reduce the rotation change of the photosensitive drum, etc., eccentricity of the photosensitive drum surface caused by the photosensitive drum itself or attachment thereof, eccentricity of a deceleration or transmission gear, eccentricity of a gear shaft, eccentricity caused by a clearance error of the rotation shaft of the photosensitive drum, belt drive roller, etc., or the like exists, and an AC color registration shift causes image quality to worsen.

Nevertheless, the registration image sampling correction system according to the proposition does not apply a correction to the AC component of the color registration shift, and cannot even detect the AC component color registration shift under the current circumstances.

The present applicant already proposes an image formation system which can solve the problem, detect a registration shift AC component, and discriminate a registration shift error caused by the AC component (Japanese Patent application No. Hei. 7-89892).

However, to detect a registration shift AC component, the image formation system according to the proposition uses detection patterns designed for detecting a DC component registration shift with high accuracy as they are. Thus, from the viewpoints of data resolution and precision, the detection patterns do not provide sufficient information for performing advanced control in such a manner that an AC component of a registration shift occurring in the image formation system and that the detected AC component registration shift is fed back into the drive system of the photosensitive drums and the transfer belt for correcting the AC color registration shift.

Further, for the detection patterns for detecting a DC component registration shift, the color shift detection patterns are spaced widely from each other, as shown in FIG. 33, and an AC component registration shift obtained by detecting the color shift detection patterns is limited to vibration components at very low frequencies. On the other hand, AC components occurring in the image formation system involve various frequency change factors, such as the cycle of one periphery of the photosensitive drum, the cycle of one periphery of the transfer belt drive roll, vibration and eccentric components of gears for driving them, and walk of the transfer belt; high-frequency AC components changing in a short cycle exist. Thus, the AC component registration shift detected as described above contains little information concerning rotation change of the drive system of the photosensitive drums, the transfer belt, etc., and rotation change of the drive system of the photosensitive drums, the transfer belt, etc., cannot accurately be detected for performing predetermined control.

If the color registration shift is suppressed to high accuracy, for example, 70 μm or less to meet the demand for providing high picture quality in the conventional color image formation system, a technique is required for reducing AC components by executing active control so as to decrease the absolute amounts of registration shifts of DC and AC components, detect rotation change of the drive system of the photosensitive drums, the transfer belt, etc., at any time, and cancel out the effect of the AC component registration shift. However, the conventional color image formation system cannot accurately detect an AC color registration shift caused by rotation change of the drive system of the photosensitive drums, the transfer belt, etc., and thus cannot cover high accuracy of color registration.

Further, to precisely detect an AC component registration shift occurring in the color image formation system, it is desirable to measure the AC component registration shift at high frequencies than the vibration component occurring in the color image formation system according to a sampling theorem. However, the color image formation system contains a fairly high frequency vibration component caused by the drive gear, etc., and to detect the component, very minute color shift detection patterns must be formed with high accuracy. Moreover, to sample the color shift detection patterns formed on the transfer belt, the color shift detection patterns cannot be formed at high frequencies, namely, in too much a narrow spacing because of the physical dimensions of the width, length, etc., of the color shift detection patterns, the processing time of data detecting the color shift detection patterns, etc.

In this connection, the sampling theorem is a theorem that "when the frequency component of signal f (t) of a function of time t is limited to W hertz or less, the signal f (t) can be completely restored from the value of the signal measured at ½W time intervals, f (½W) where i=1, 2, . . . " In other words, it is a theorem that to reproduce an original signal from sampling data, the sampling frequency needs to be twice or more the maximum frequency of a spectrum distribution of the original signal."

SUMMARY OF THE INVENTION

It is therefore an object of the invention to provide an image formation system that can detect an AC color registration shift with good accuracy and provide sufficient data as information for actively controlling the drive system of rotation bodies such as photosensitive drums and a transfer belt and reducing the AC color registration shift even if color shift detection patterns are formed under limited conditions An image formation system according to the invention forms a plurality of images different in color on a transfer material 02 supported on an endless support 01 rotated or directly on the endless support by a plurality of image. formation means 03K, 03Y, 03M, and 03C, thereby forming an image, and forms color shift-detection patterns on the rotated endless support 01 by color shift correction means 04, samples the color shift detection patterns, and performs predetermined control operation, wherein color shift detection patterns 01 for detecting cyclic rotation change occurring in the image formation system are provided, as shown in FIGS. 1A and 1B.

According to the invention, the image formation system may have a plurality of sets of the color shift detection patterns.

According to the invention, the image formation system may have only one set of the color shift detection patterns for sampling the single color shift detection pattern at a plurality of sampling frequencies.

According to the invention, in the image formation system, spacing between the color shift detection patterns in a move direction of the endless support is set corresponding to frequency of cyclic rotation change occurring in the image formation system.

According to the invention, in the image formation system, sampling frequency of the color shift detection pattern is set corresponding to frequency of the rotation change to be detected among cyclic rotation changes occurring in the image formation system.

According to the invention, in the image formation system, sampling frequency of the color shift detection pattern is set corresponding to higher-frequency rotation change among cyclic rotation changes occurring in the image formation system.

According to the invention, in the image formation system, the color shift detection patterns consist of patterns repeatedly formed in a predetermined spacing along a move direction of the endless support and patterns formed in a direction perpendicular to the move direction of the endless support and the patterns formed along the move direction of the endless support and the patterns formed in the direction perpendicular to the move direction of the endless support are sampled separately.

According to the invention, in the image formation system, the color shift detection patterns are sampled separately for each color.

According to the invention, in the image formation system, the color shift detection patterns are sampled after the termination of at least either of rough and fine adjustments of a DC color registration correction cycle just after power of the system is turned on.

The image formation system according to the invention provides the color shift detection patterns for detecting cyclic rotation change occurring in the image formation system. Thus, even if the color shift detection patterns are formed under limited conditions, cyclic rotation change occurring in the image formation system may be considered to form the color shift detection patterns. An AC color registration shift can be detected with good accuracy according to the color shift detection patterns for detecting cyclic rotation change occurring in the image formation system, and sufficient data as information for actively controlling the drive system of the rotation bodies such as the photosensitive drums and the transfer belt and reducing the AC color registration shift can be provided.

The image formation system according to the invention has a plurality of sets of the color shift detection patterns. Thus, even if there are a plurality of cyclic rotation changes occurring in the image formation system, they can be detected with good accuracy according to the color shift detection patterns.

On the other hand, the image formation system according to the invention has only one set of the color shift detection patterns for sampling the single color shift detection pattern at a plurality of sampling frequencies. Thus, only one color shift detection pattern set may be formed and color shift detection pattern formation can be executed easily.

In the image formation system according to the invention, the spacing between the color shift detection patterns in the move direction of the endless support is set corresponding to the frequency of cyclic rotation change occurring in the image formation system. Thus, cyclic rotation change occurring in the image formation system can be detected with good accuracy according to the color shift detection patterns matching the rotation change.

In the image formation system according to the invention, the sampling frequency of the color shift detection pattern is set corresponding to the frequency of the rotation change to be detected among cyclic rotation changes occurring in the image formation system. Thus, even if there are a plurality of cyclic rotation changes occurring in the image formation system, a specific cyclic rotation change can be detected with good accuracy.

In the image formation system according to the invention, the sampling frequency of the color shift detection pattern is set corresponding to higher-frequency rotation change among cyclic rotation changes occurring in the image formation system. Thus, as seen from the sampling theorem only low-frequency rotation change can be detected without detecting high-frequency rotation change.

In the image formation system according to the invention, the color shift detection patterns consist of patterns repeatedly formed in a predetermined spacing along the move direction of the endless support and patterns formed in a direction perpendicular to the move direction of the endless support and the patterns formed along the move direction of the endless support and the patterns formed in the direction perpendicular to the move direction of the endless support are sampled separately. Thus, the patterns in the move direction of the endless support and the patterns in the direction perpendicular to the move direction are sampled separately, whereby even if the pattern spacing along the move direction of the endless support is narrow, sufficient data processing time can be provided.

In the image formation system according to the invention, the color shift detection patterns are sampled separately for each color. Thus, the pattern spacing of each color can be set narrow and even if the frequency of cyclic rotation change occurring in the image formation system is high, the rotation change can be changed with good accuracy.

In the image formation system according to the invention, the color shift detection patterns are sampled after the termination of at least either of rough and fine adjustments of a DC color registration correction cycle just after power of the system is turned on. Thus, when an AC color registration shift is detected, at least the rough adjustment of the DC color registration correction cycle terminates. The color shift detection patterns for detecting cyclic rotation change occurring in the image formation system can be formed with good accuracy and the color shift detection patterns can be reliably prevented from overlapping each other. Further, if the AC color shift detection pattern sampling and correction cycle is performed between rough and fine adjustments in the DC color registration correction cycle just after the system power is turned on, the subsequent fine adjustment in the DC color registration correction cycle can be made with good accuracy.

The above and other objects and features of the present invention will be more apparent from the following description, taken in conjunction with the accompanying drawings.

BRIEF DESCRIPTION OF THE DRAWINGS

In the accompanying drawings:

FIGS. 15A and 15B are tables showing the relationship between frequencies of rotation change and sampling frequencies;

DETAILED DESCRIPTION OF THE PREFERRED EMBODIMENTS

Referring now to the accompanying drawings, there are shown preferred embodiments of the invention.

Embodiment 1

Figure 1A:
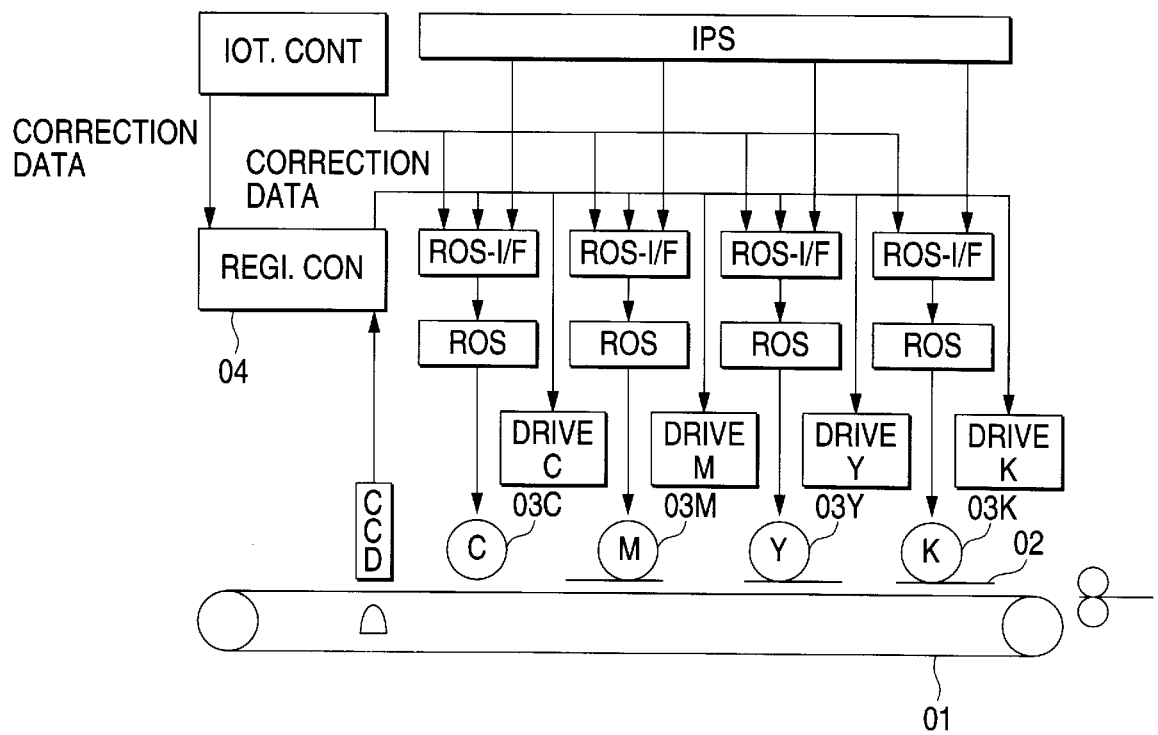
FIGS. 1A and 1B are a conceptual diagram showing an image formation system according to the invention and a plane view showing an AC color shift detection pattern.
Figure 1B:
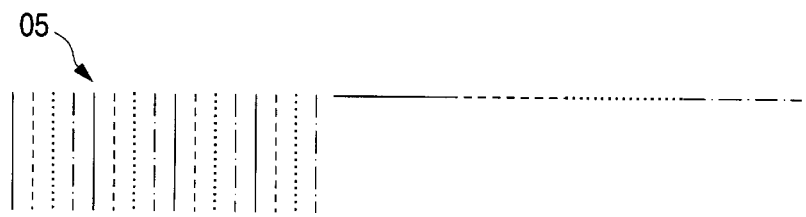
Figure 2:
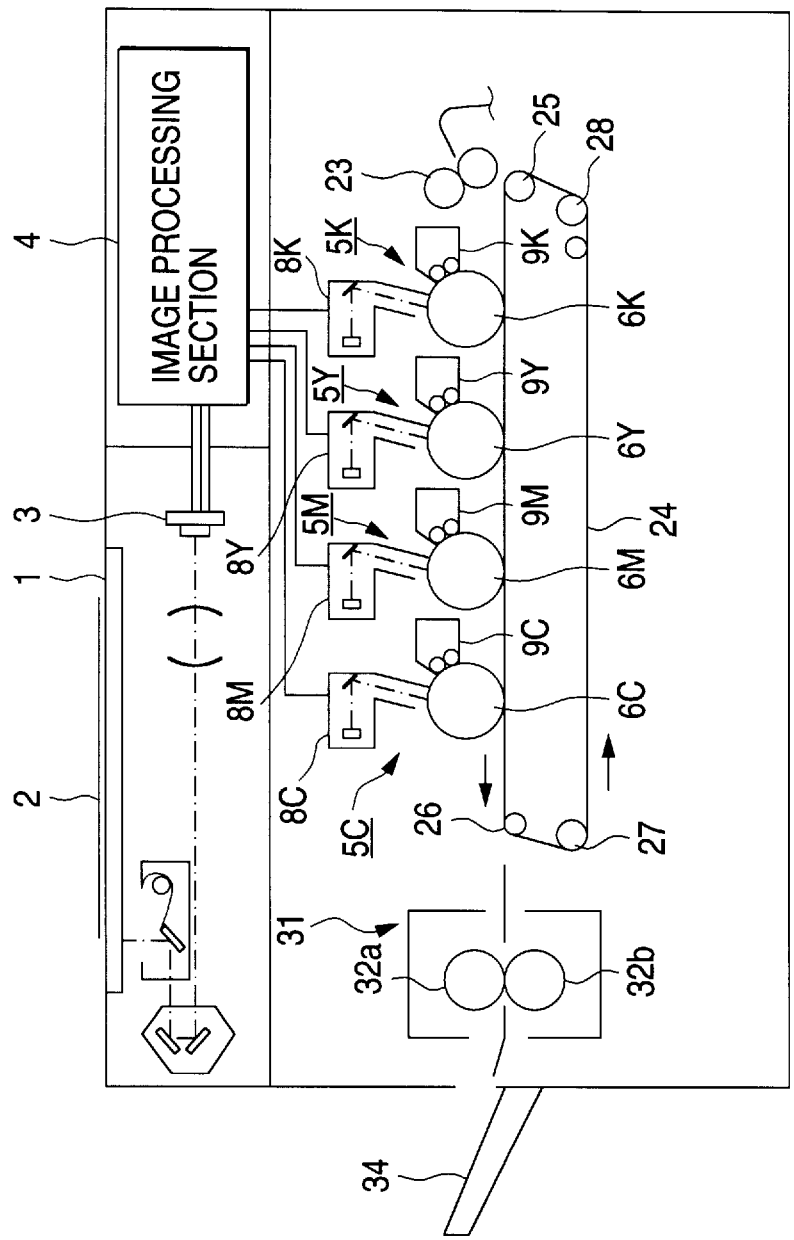
FIG. 2 is a block diagram showing a digital color copier according to one embodiment of the invention.

FIG. 2 is a general block diagram showing a digital color copier of an image formation system according to one embodiment of the invention.

In FIG. 2, an original document 2 placed on platen glass 1 is read as RGB analog image signals by an image scanner comprising a color CCD sensor 3 via a scan optical system consisting of a light source, a scan mirror, etc. The RGB analog image signals read by the color CCD sensor 3 are converted into KYMC image signals by an image processing section 4 and the KYMC image signals are temporarily stored in a memory disposed in the image processing section 4.

Figure 3:
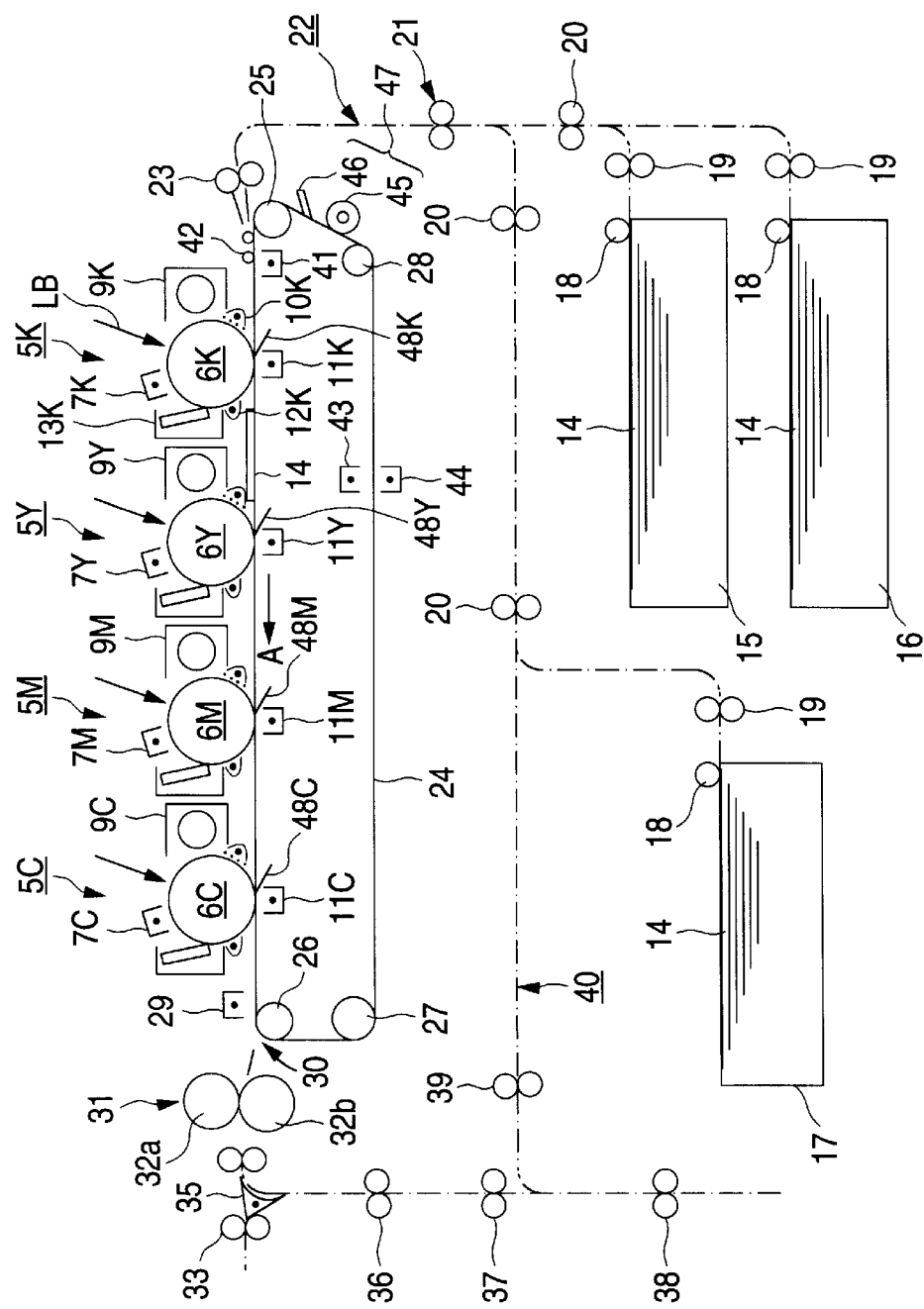
FIG. 3 is another block diagram showing the digital color copier according to the embodiment of the invention.

As shown in FIGS. 2 and 3, the image processing section 4 outputs black (K), yellow (Y), magenta (M), and cyan (C) color image data in sequence to ROSs (raster output scanners) 8K, 8Y, 8M, and 8C of black (K), yellow (Y), magenta (M), and cyan (C) color image formation units 5K, 5Y, 5M, and 5C, and the surfaces of photosensitive drums 6K, 6Y, 6M, and 6C are scanned by and exposed to laser beams LBs output by the ROSs 8K, 8Y, 8M, and 8C in response to the image data for forming electrostatic latent images. These electrostatic latent images formed on the photosensitive drums 6K, 6Y, 6M and 6C are developed as black (K), yellow (Y), magenta (M), and cyan (C) color toner images respectively by developing units 9K, 9Y, 9M, and 9C.

Transfer paper 14 of a predetermined size to which the color toner images formed on the photosensitive drums 6K, 6Y, 6M, and 6C are to be transferred is transported from any of paper feed cassettes 15, 16, and 17 via a paper transport passage 22 made up of a paper feed roller 18 and paper transport roller pairs 19, 20, and 21, as shown in FIG. 3. The transfer paper 14 supplied from any of the paper feed cassettes 15–17 is sent onto a transfer belt 24 as an endless support by a registration roll 23 rotated at a predetermined timing. The transfer belt 24 is placed on a drive roller 25, a stripping roller 26, a tension roller 27, and an idle roller 28 endlessly under a given tension, and is circulated at a predetermined speed in the arrow direction by the drive roller 25 rotated by a dedicated motor (not shown) having an excellent constant speed property. Used as the transfer belt 24 is, for example, a belt shaped like an endless belt by forming a synthetic resin film of PET, etc., having flexibility like a band and connecting both ends of the synthetic resin film formed like a band by means of welding, etc.

The paper feed timing and image write timing are determined so that the tip of the transfer paper 14 transferred on the transfer belt 24 and the tip of the image formed on the first photosensitive drum 6K by the first image formation unit; 5K match at the lowest transfer point of the photosensitive drum 6K. The visible image on the photosensitive drum 6K is transferred by a transfer corotron 11K to the transfer paper 14 arriving at the transfer point, and further the transfer paper 14 arrives at a transfer point just below the photosensitive drum 6Y. Likewise, the visible image on the photosensitive drum 6Y is transferred to the transfer paper 14 arriving at the transfer point just below the photosensitive drum 6Y. When the visible images on other photosensitive drums have been transferred to the transfer paper 14 in a similar manner, the transfer paper 14 is furthermore transported on the transfer belt 24. When the transfer paper 14 reaches the proximity of the stripping roller 26, it undergoes electricity removal by an electricity removal corotron 29 for stripping and is stripped off from the transfer belt 24 by the stripping roller 26 whose curvature radius is set small and a stripping claw 30. Then, the transfer paper 14 to which the four color toner images have been transferred is fixed by a fuser 31 with a heating roller 32a and a pressurizing roller 32b and is discharged onto a discharge tray 34 shown in FIG. 2 by a discharge roller pair 33, and a color image is copied.

To copy a full color image to both sides of the transfer paper 14, as shown in FIG. 3, without discharging the transfer paper 14 with a color image formed on one side by the discharge roller pair 33, the transport direction of the transfer paper 14 is changed downward by a change plate 35 and the transfer paper 14 which is turned out is transported via a paper transport passage 40 made up of paper transport roller pairs 36, 37, 38, 39, etc., to the transfer belt 24 again through the paper transport passage 22, then a color image is formed on the rear face of the transfer paper 14 in a similar process as described above.

As shown in FIG. 3, the black, yellow, magenta, and cyan color image formation units 5K, 5Y, 5M, and 5C are the same in configuration and form black, yellow, magenta, and cyan toner images respectively in sequence at predetermined timing, as described above. The color image formation units 5K, 5Y, 5M, and 5C comprise photosensitive drums 6K, 6Y, 6M, and 6C. The surfaces of the photosensitive drums 6K, 6Y, 6M, and 6C are uniformly charged by scorotrons 7K, 7Y, 7M, and 7C for primary charge, then are scanned by and exposed to laser beams LBs for image formation emitted from the ROSs 8K, 8Y, 8M, and 8C in response to image data for forming electrostatic latent images corresponding to the colors. The electrostatic latent images formed on the surfaces of the photosensitive drums 6K, 6Y, 6M, and 6C are developed with black toner, yellow toner, magenta toner, and cyan toner by the developing units 9K, 9Y, 9M, and 9C of the color image formation units 5K, 5Y, 5M, and 5C to form visible toner images, which then are before-transfer charged by before-transfer chargers 10K, 10Y, 10M, and 10C, then charged by transfer chargers 11K, 11Y, 11M, and 11C for transfer to the transfer paper 14 held on the transfer belt 24 in sequence. The transfer paper 14 to which the black, yellow, magenta, and cyan toner images have been transferred is detached from the transfer belt 24, then is fixed by the fuser 31 for forming a color image, as described above.

Further, the transfer paper 14 is supplied from any of the paper feed cassettes 15–17 and is transported onto the transfer belt 24 at a predetermined timing by the resist roll 23. It is also held and transported on the transfer belt 24 by a paper holding charger 41 and a charge roll 42.

After the completion of the toner image transfer step, the photosensitive drums 6K, 6Y, 6M, and 6C undergo electricity removal by before-cleaning electricity removers 12K, 12Y, 12M and 12C, and remaining toner, etc., on the drums is removed by cleaners 13K, 13Y, 13M, and 13C for the next image formation process.

The transfer belt 24, from which the transfer paper 14 has been stripped off, undergoes electricity removal by transfer belt electricity removal corotron pairs 43 and 44 in the circulating track, and toner, paper powder, and the like on the surface of the transfer belt 24 are removed by a cleaning unit 47 consisting of a rotating brush 45 and a blade 46.

Figure 4:
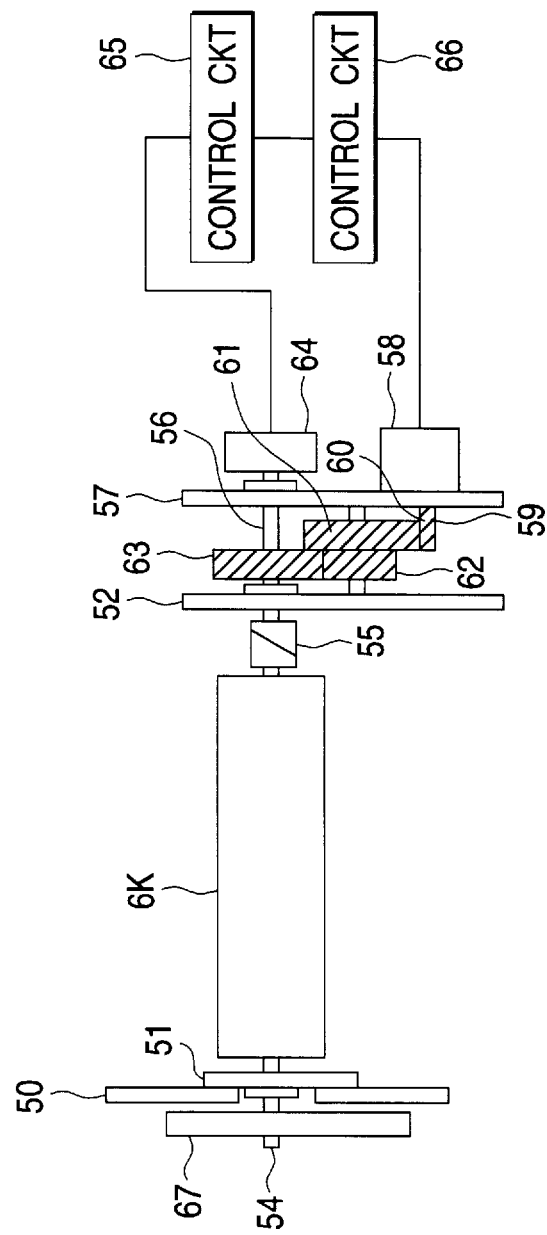
FIG. 4 is a block diagram showing a phoosensitive drum drive.

In the digital color copier thus configured, for example, the following are used as drives for rotating the photosensitive drums 6K, 6Y, 6M, and 6C. They are provided in a one-to-one correspondence with the photosensitive drums and are the same in configuration. Here, the drive for the photosensitive drum 6K will be discussed. As shown in FIG. 4, the drive for the photosensitive drum 6K pivotally supports the photosensitive drum 6K rotatably between a sub-frame 51 attached to a first frame 50 positioned on the front of the copier main unit and a second frame 52 placed in parallel with the first frame 50 and pivotally supports a drive shaft 56 coupled via a coupling 55 to a rotation shaft 54 of the photosensitive drum 6K rotatably between the second frame 52 and a third frame 57. The photosensitive drum 6K is rotated by a drive motor 58, a motor shaft gear 60 disposed on a rotation shaft 59 of the drive motor 59, a first intermediate gear 61 meshing with the motor shaft gear 60, a second intermediate gear 62 fixedly secured to the same shaft as the first intermediate gear 61, and a photosensitive body drive gear 63 fixedly secured to the drive shaft 56 of the photosensitive drum 6K meshing with the second intermediate gear 62. An encoder 64 is attached to the drive shaft 56 of the photosensitive drum 6K for detecting the rotation state of the photosensitive drum 6K and feeding back a detection signal via a control circuit 65 into a drive circuit 66 of the drive motor 58 for controlling so that the rotation speed of the photosensitive drum 6K becomes constant. In FIG. 4, numeral 67 denotes a fly wheel attached to the rotation shaft 59 of the photosensitive drum 6K.

A drive roll 25 for rotating the transfer belt 24 is also rotated by a drive similar to the drive of the photosensitive drum 6K.

Figure 5:
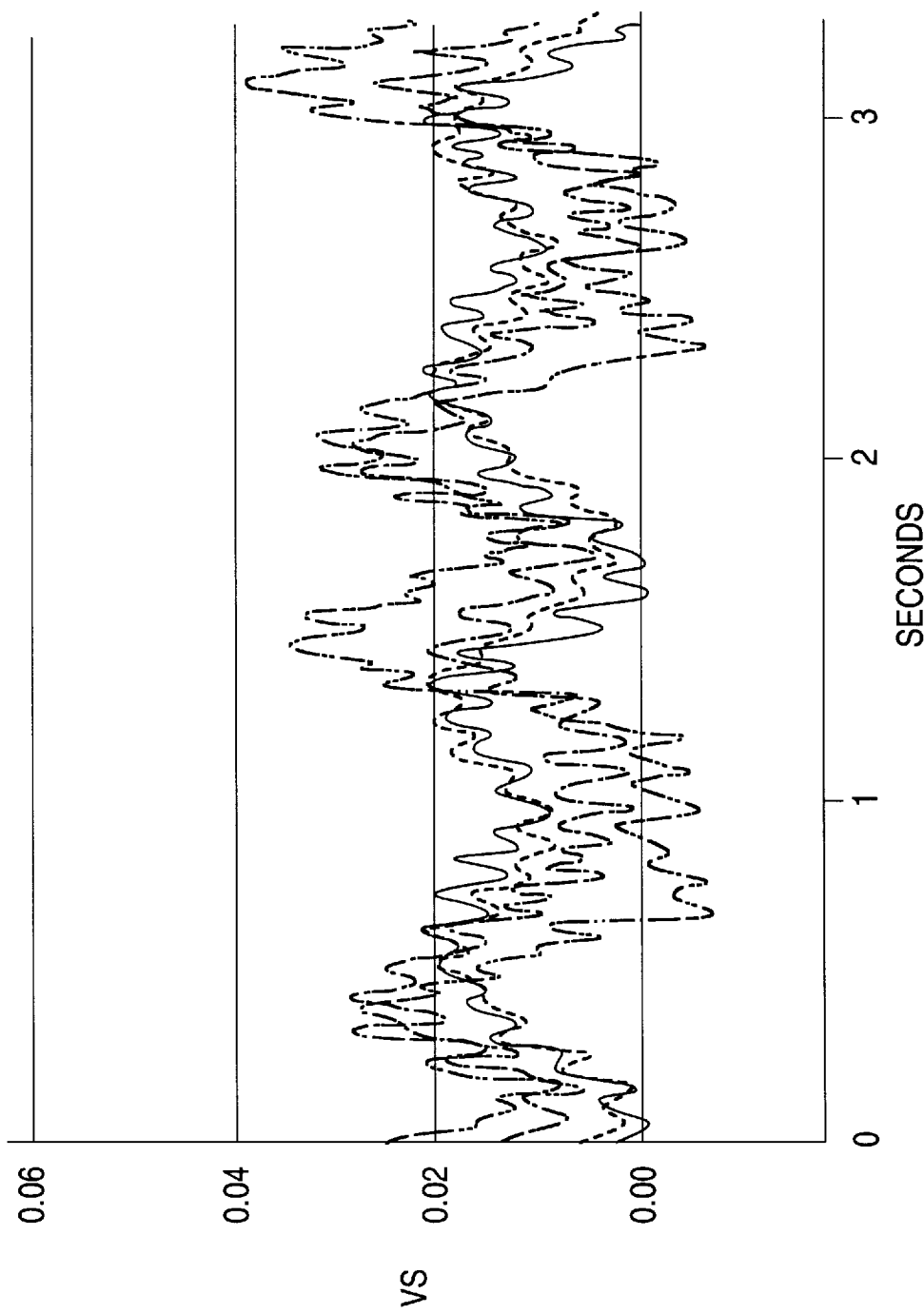
FIG. 5 is a graph showing rotation change of black, yellow, magenta, and cyan photosensitive drums.

In the digital color copier thus configured, rotation change at comparatively high frequencies changing in short; cycles, such as the cycle of one periphery of the photosensitive drum 6K, 6Y, 6M, 6C, the cycle of one periphery of the drive roll 25 of the transfer belt 24, vibration and eccentric components of gears for driving them, or so-called walk of the transfer belt 24 moving in a direction perpendicular to the move direction, occurs and appears as rotation change of colors of black, yellow, magenta, and cyan, as shown in FIG. 5.

Figure 6:
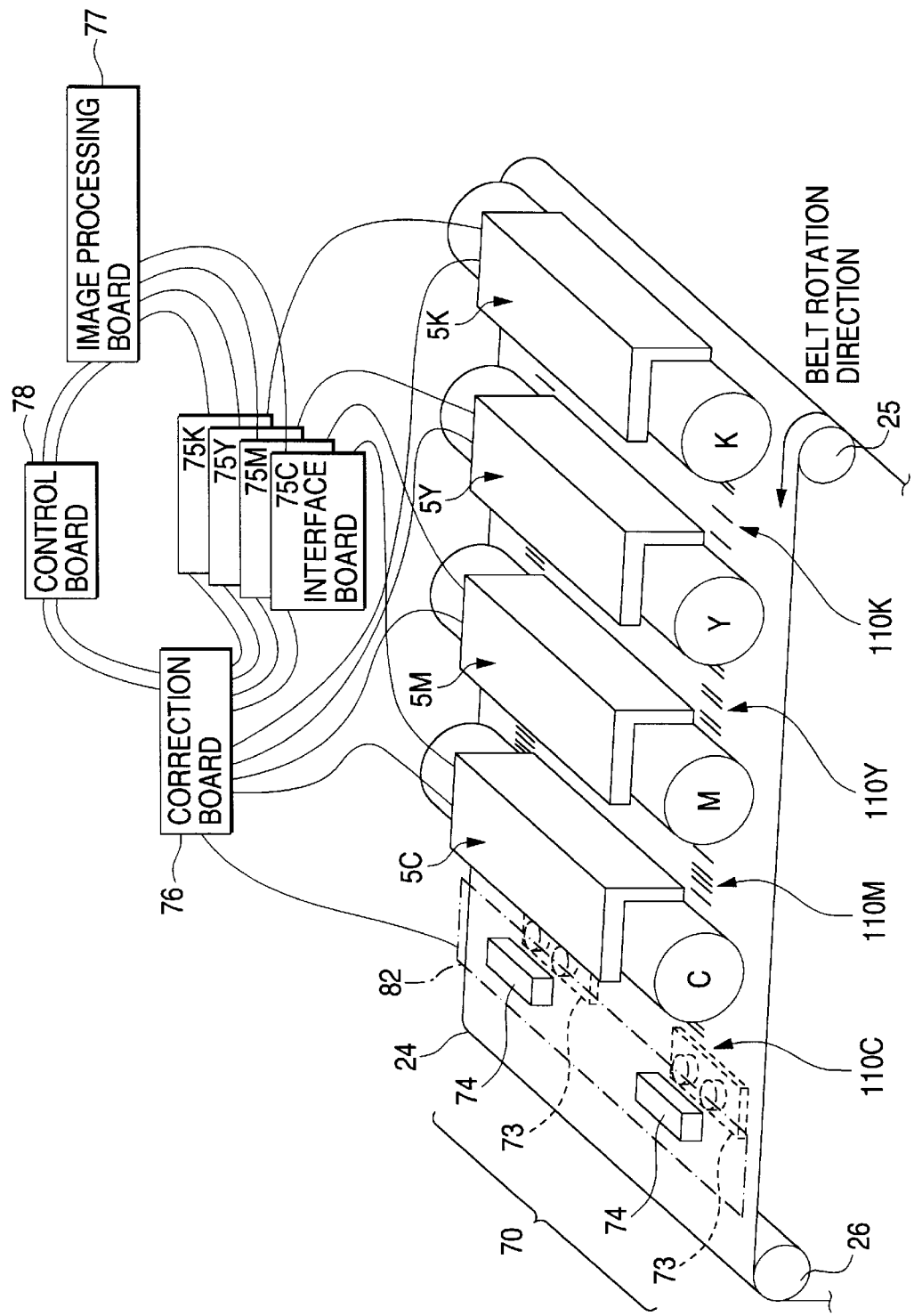
FIG. 6 is a perspective block diagram showing the main part of the digital color copier according to the embodiment of the invention.

FIG. 6 is a schematic diagram to show an image formation section of the digital color copier together with a control section.

In the figure, numeral 70 is color shift detection pattern detection means for detecting a color shift detection pattern image 71 on the transfer belt 24 formed by the image formation units 5K, 5Y, 5M, and 5C. This pattern detection, means 70 comprises a pair of light sources 73 and a pair of light receiving elements 74 placed at both ends of the width direction in an image area of the transfer belt 24. The light source 73 is made up of LEDs for producing background light required for detecting the color shift detection pattern image 71 on the transfer belt 24. The light receiving element 74 is placed so as to face the light source 73 with the transfer belt 24 between and is made up of CCDs as line light receiving devices comprising a large number of light receiving pixels arranged linearly.

Symbols 75K, 75Y, 75M, and 75C are interface boards for sending image signals to the ROSs 8K, 8Y, 8M, and 8C in the image formation units 5K, 5Y, 5M, and 5C, and numeral 76 is a correction board for controlling a color shift correction system. Numeral 77 is an image processing board for taking charge of memory and image processing. Numeral 78 is a control board for controlling all the boards and the entire digital color copier.

Figure 7:
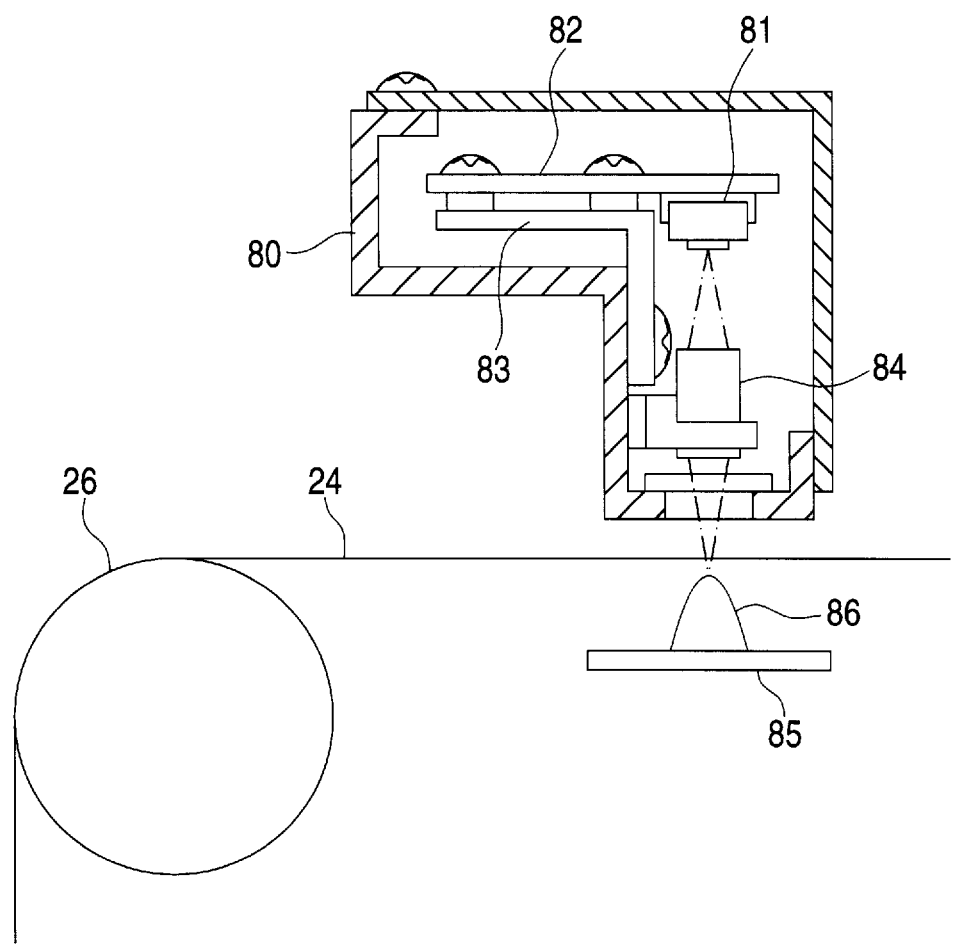
FIG. 7 is a sectional block diagram showing a sensor.

FIG. 7 is a sectional view to show the color shift detection pattern detection means.

In the figure, numeral 80 is a cabinet of the pattern detection means, numeral 81 is a linear CCD unit as the light receiving element 74, and numeral 82 is a board on which the linear CCD unit 81 and a peripheral circuit for driving it are mounted. This board 82 is attached to the cabinet 80 via an angle 83 like L in cross section. Numeral 84 is a lens array of refractive index distribution type and numeral 85 is a board on which an illumination light source 86 as the light source 74 and a peripheral circuit for driving it are mounted.

Figure 8:
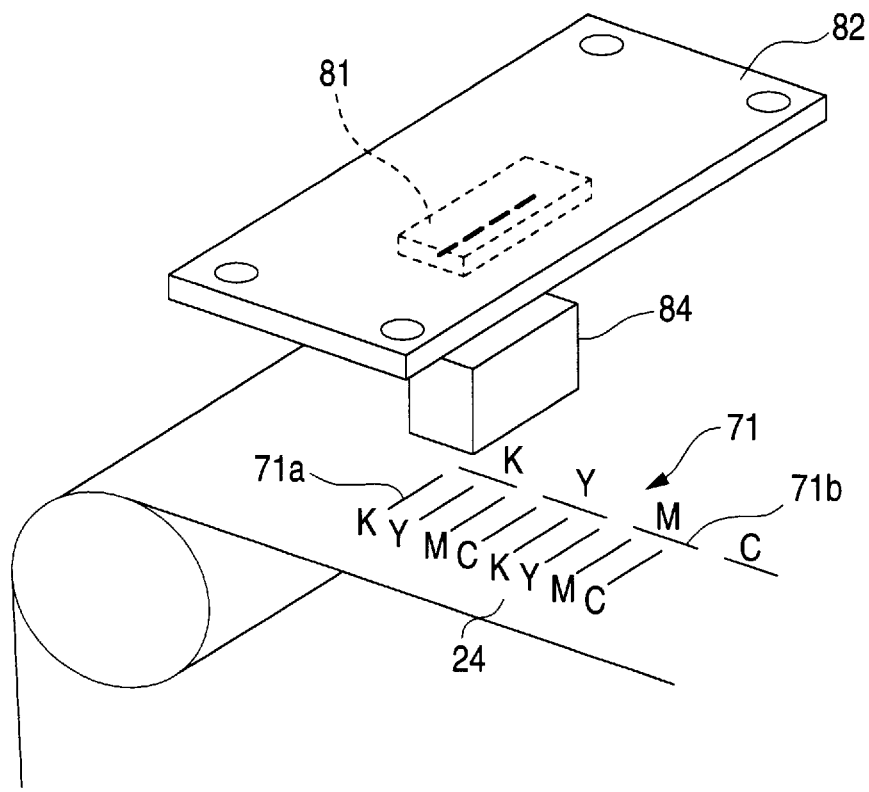
FIG. 8 is a perspective view showing the sensor in FIG. 7.

FIG. 8 shows stereoscopically the positional relationship among the sensor board 82, the lens array of refractive index distribution type 84, and the image position detection pattern image 71 on the transfer belt 24. Two pairs of the sensor boards 82 and the lens arrays of refractive index distribution type 84 shown here are placed in the cabinet 80. Moreover, the cabinet 80 is disposed at both ends of the width direction in the image area of the transfer belt 24. The linear CCD unit 81 attached to one sensor board 82 is provided for detecting both horizontal and vertical scanning directions of the color shift detection pattern image 71 on the front side and the linear CCD unit 81 attached to the other sensor board 82 is provided for detecting those on the depth side. The two sensors can be thus used for adjustment in all directions of color shifts such as a shift in the horizontal scanning direction in the vicinity of the center of copy, a shift in the vertical scanning direction in the vicinity of the center of copy, a magnification error in the horizontal scanning direction, and an angle shift with respect to the horizontal scanning direction; for example, if an adjustment only in the horizontal scanning direction is made, only one detection sensor may be used. The cabinet 80 containing the two sensors thus configured is disposed at both ends of the width direction in the image area of the transfer belt 24, as shown in FIG. 6.

Further, an LED is used as the illumination light source 86. When one LED is not enough to provide a necessary illumination range, more than one LED may be used. For example, when one sensor CCD unit 81 detects a shift in the scanning start position of the laser beam scanner, namely, the horizontal scanning direction and a shift in the transfer transport position, namely, the vertical scanning direction at: comparatively near positions, one LED 86 is assigned; when one sensor CCD unit 81 detects them at comparatively distant positions, two LEDs are assigned. At this time, light gathering type LED 86 is made to approach the transfer belt 24, whereby an illumination width almost equal to the outer form of the LED is provided and several LEDs go on, thus power consumption can be cut down very much.

Figure 9:
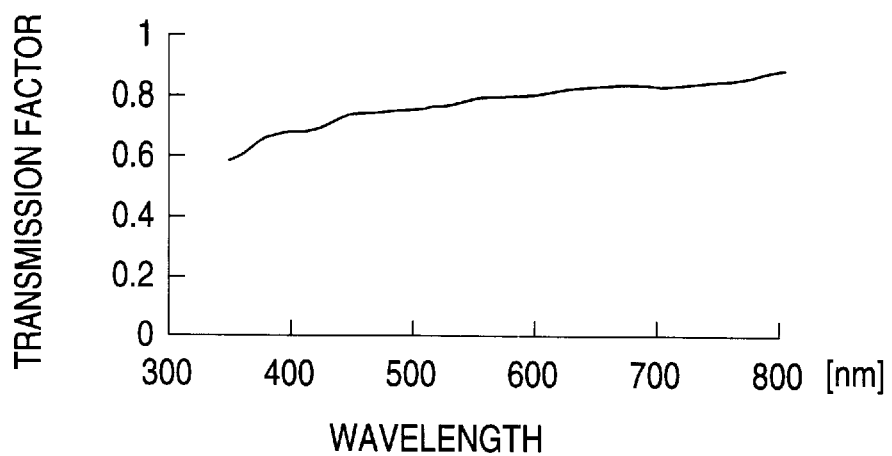
FIG. 9 is a graph showing the relationship between transmission factor and wavelength.
Figure 10:
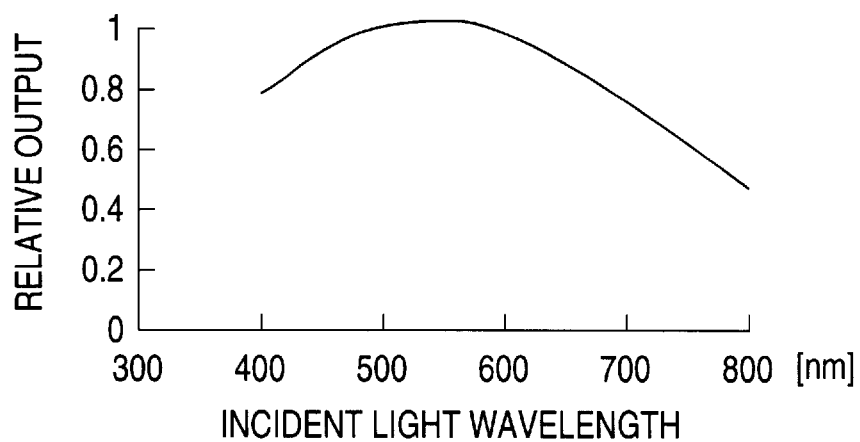
FIG. 10 is a graph showing the relationship between relative output of the sensor and incident light wavelength.
Figure 11:
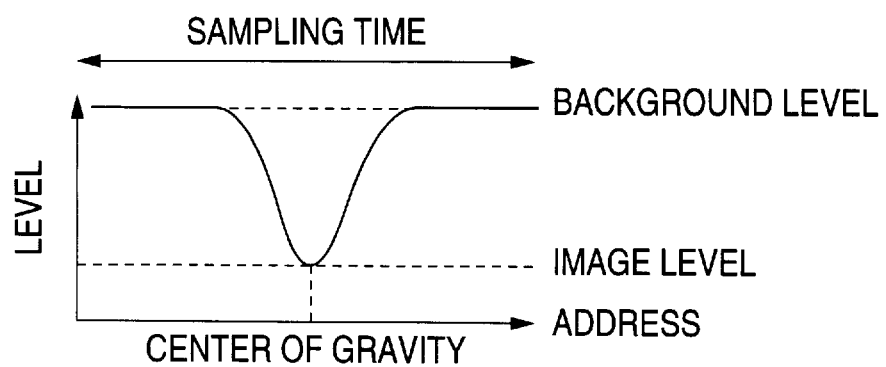
FIG. 11 is a waveform chart showing output of the sensor.

In the embodiment, for example, a transparent belt 24 made of PET (polyethylene terephthalate) is used as transfer: transport means. The transfer belt 24 is shaped like an endless belt by connecting both ends of a PET film formed like a band by means of welding, etc. As a representative transmission characteristic of the transfer transport belt 24, the transmission factor rises as the wavelength becomes long, as shown in FIG. 9. A representative sensitivity characteristic of the CCD unit 81, which is shown in FIG. 10, provides good sensitivity in a visible light area. On the other hand, the light emission wavelength of the LED 86 for providing high intensity is a red area (600–700 nm) and they can be combined to produce large sensor output. When the pattern image 71 on the transfer belt 24 arrives at a detection position, toner for forming the pattern image 71 is opaque regardless of the color, thus the transmission factor at the pattern position is near 0 and sensor output becomes very small. The larger the sensor output difference, the stabler is detection. An output example in the configuration is shown in FIG. 11; almost equal output is provided for each of K, Y, M, and C colors.

Figure 12:
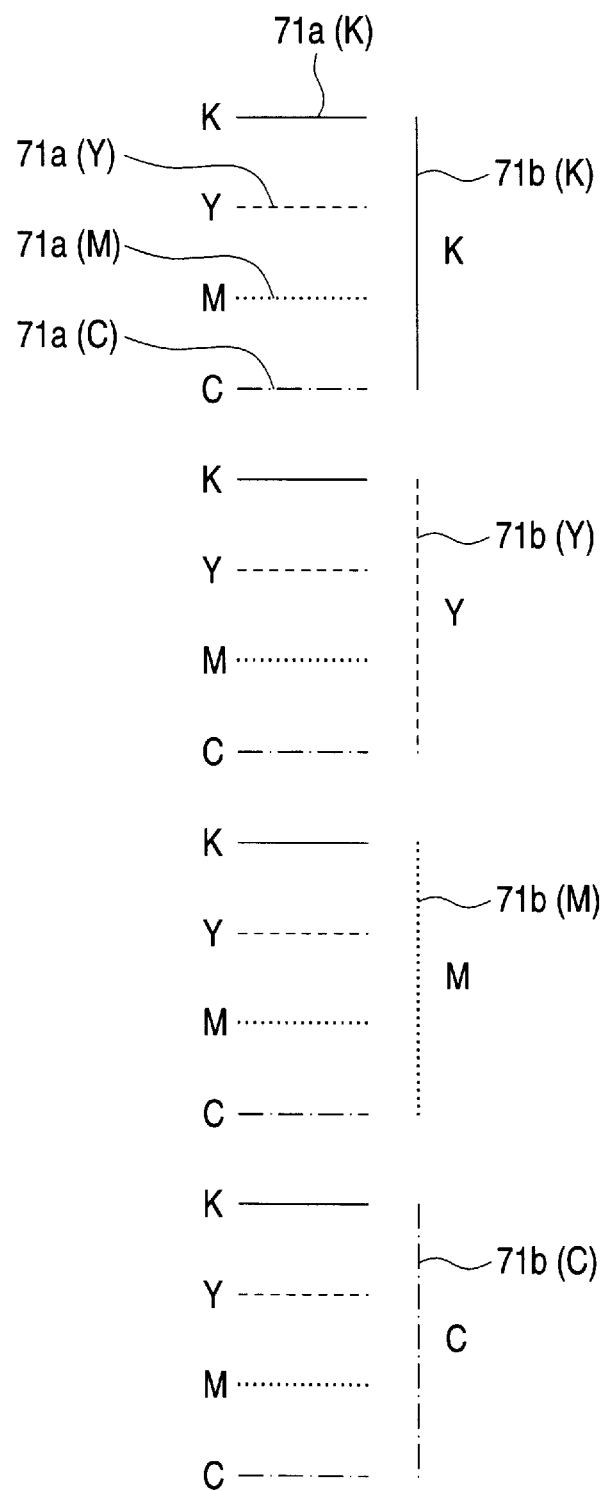
FIG. 12 is a plan view showing a DC registration shift measurement pattern image.

Used as the DC color shift detection pattern image 71 is, for example, a pattern image consisting of color shift detection patterns 71*b* (K), 71*b* (Y), 71*b* (M), and 71*b* (C) along the vertical scanning direction for detecting a shift in the horizontal scanning direction, which is a direction perpendicular to the travel direction of the transfer belt 24, and color shift detection patterns 71*a* (K), 71*a* (Y), 71*a* (M), and 71*a* (C) along the horizontal scannig direction for detecting a shift in the vertical scanning direction, which is the travel direction of the transfer belt 24, as shown in FIG. 12. A set of 71*a* (K), 71*a* (Y), 71*a* (M), and 71*a* (C) and a set of 71*b* (K), 71*b* (Y), 71*b* (M), and 71*b* (C) are multiple-transferred to all the periphery of the transfer belt 24 at predetermined positions that can be read by the color shift detection pattern detection means 70 placed one on the front side of the image formation units and one on the depth side thereof, as shown in FIG. 6. The color shift detection patterns 71*a* (K), 71*a* (Y), 71*a* (M), and 71*a* (C) and 71*b* (K), 71*b* (Y), 71*b* (M), and 71*b* (C) in the horizontal and vertical scanning directions comprise band-like patterns as linear portions of black (K), yellow (Y), magenta (M), and cyan (C) arranged in sequence at predetermined intervals.

Figure 13:
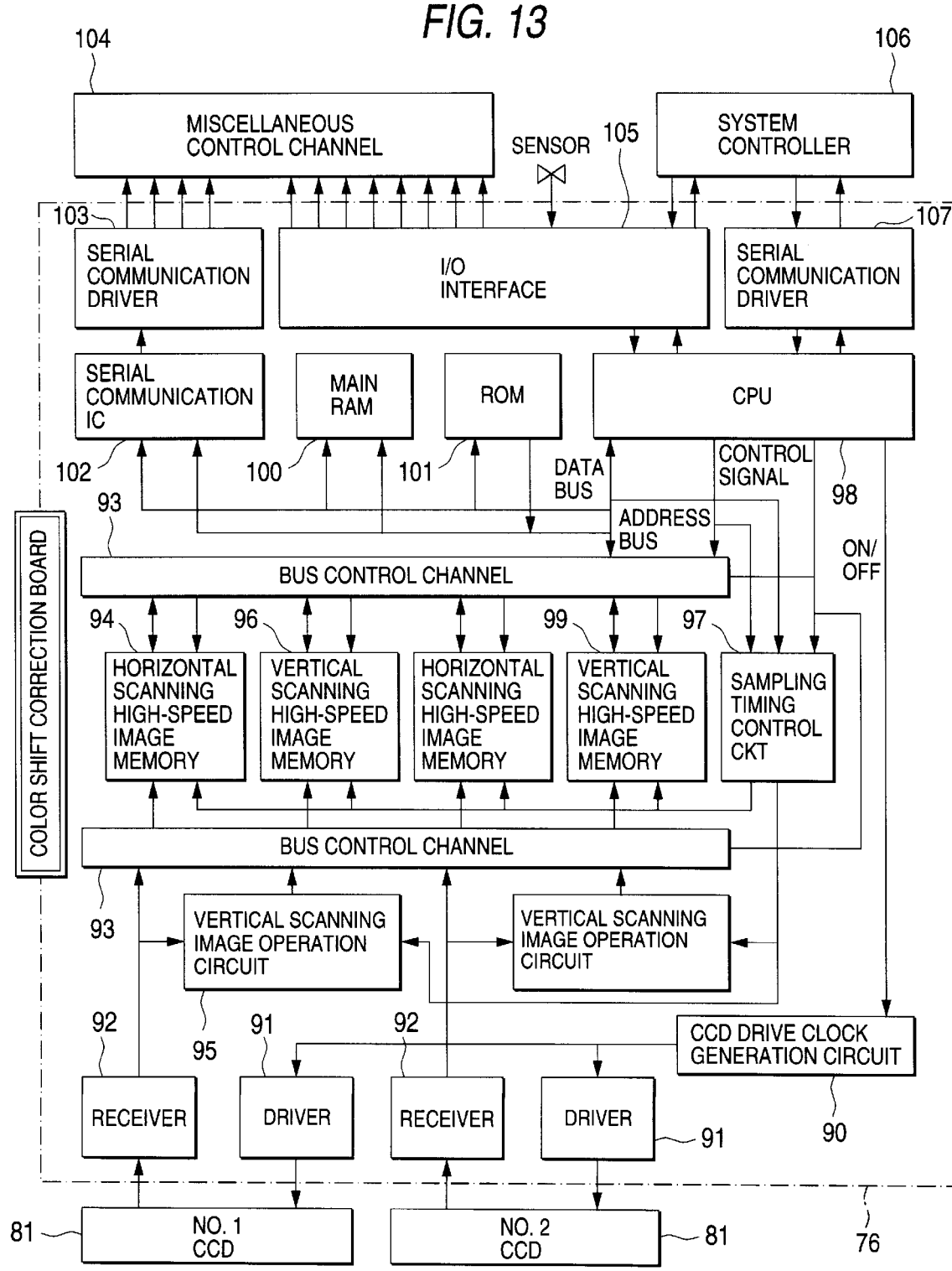
FIG. 13 is a block diagram showing a control circuit of the digital color copier according to the invention.

FIG. 13 is a block diagram to show one embodiment of a control section of a sampling unit of the color shift detection patterns according to the embodiment. The control section is disposed in the correction board 76 shown in FIG. 6.

In the correction board 76, a driver 91 drives the CCD sensor according to a clock generated by a CCD drive clock generation circuit 90 and takes, for example, 8-bit read image data of 256-level gray scale into a receiver 92 in sequence in pixel units. The image data concerning horizontal scanning is stored through a bus control channel 93 in a horizontal. scanning high-speed image memory 94 and the image data concerning vertical scanning undergoes average processing in a vertical scanning image operation circuit 95, then is stored through the bus control channel 93 in a vertical scanning high-speed image memory 96. A sampling timing control circuit 97 controls the timing for taking image data into the vertical scanning image operation circuit 95, the horizontal scanning high-speed image memory 94, and a vertical scanning high-speed image memory 99 according to the sampling start timing, sampling period, etc., set by a CPU 98. A main RAM 100 is used as a work area of the CPU 98 and a ROM 101 stores a control program of the CPU 98. A serial communication IC 102 and a serial communication driver 103 transmit control data of setup parameters, etc., from the CPU 98 to a miscellaneous control channel 104. An I/O interface 105, which is placed between the CPU 98 and the miscellaneous control channel 104, is used to output on/off signals to the miscellaneous control channel 104, input on/off signals from the sensor, and transfer on/off signals to and from a system controller 106. A serial communication driver 107 is provided for data transfer between the CPU 98 and the system controller 106.

The CPU 98 controls the CCD drive clock generation circuit 90, the sampling timing control circuit 97, and the bus control channel 93, reads registration shift measurement pattern 71 image data output onto the transfer belt 24, determines the image position address, calculates the registration shift amount, and controls the miscellaneous control channel 104 through the serial communication IC 102 and serial communication driver 103 or the I/O interface 105 and serial communication driver 107.

By the way, the embodiment provides color shift detection patterns dedicated to AC component detection for detecting cyclic rotation change occurring in the digital color copier aside from DC color registration shift detection patterns.

Figures 14A, 14B:
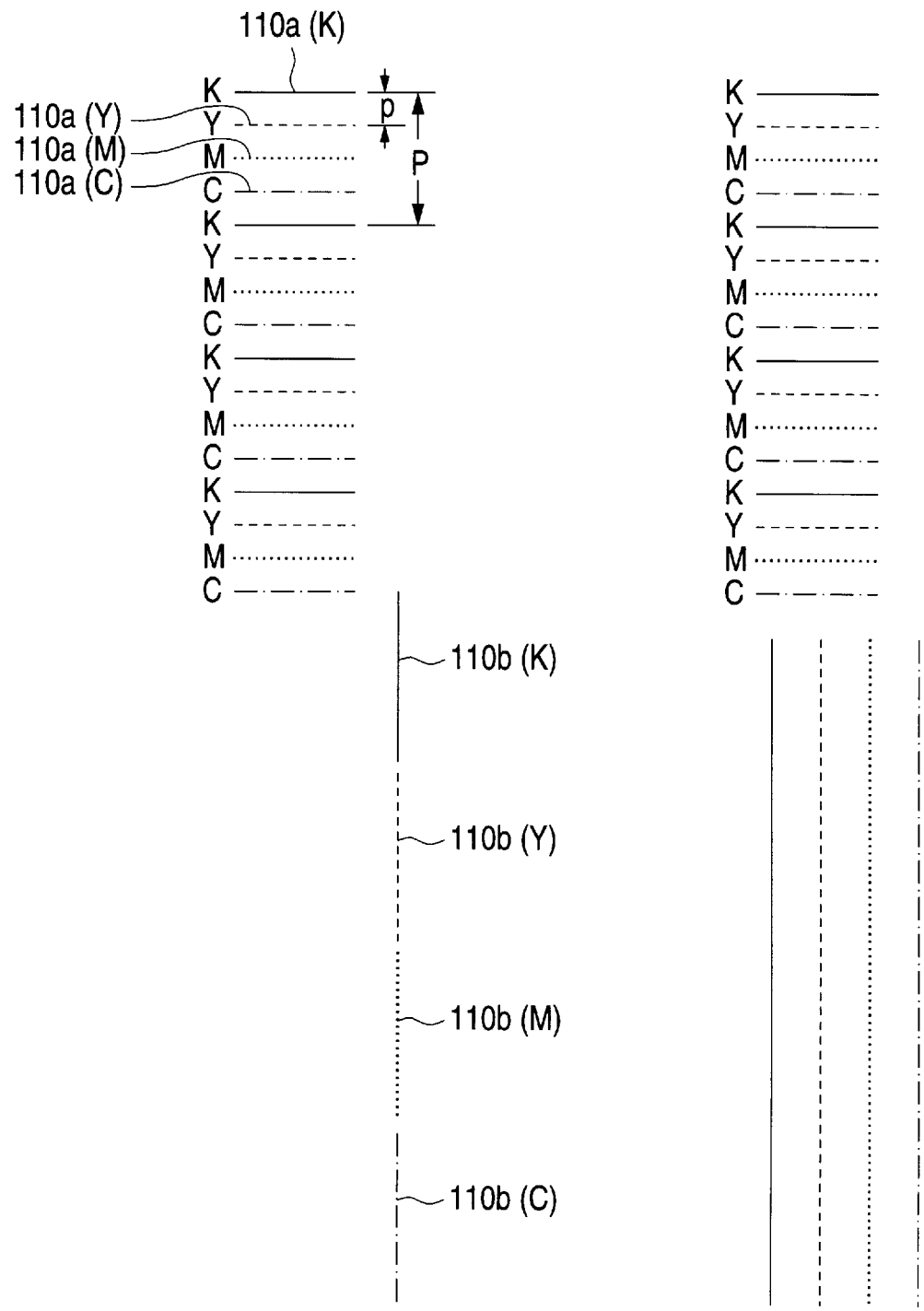
FIGS. 14A and 14B are plan views showing AC registration shift measurement patterns.
Figure 16A:
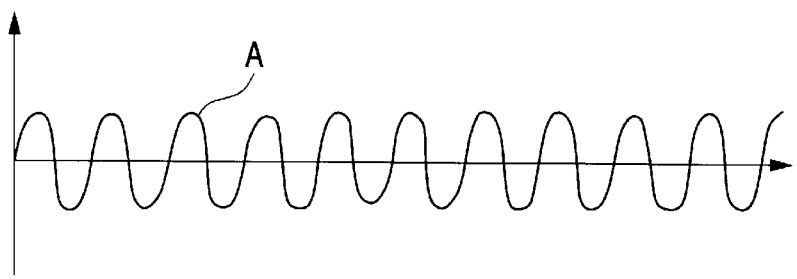
FIGS. 16A to 16D are graphs showing sampling examples of rotation change.
Figure 16B:
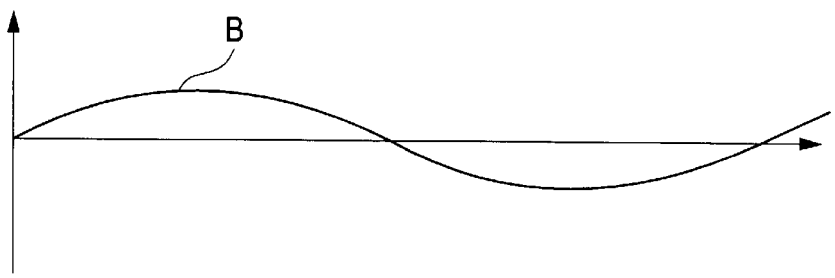
Figure 16C:
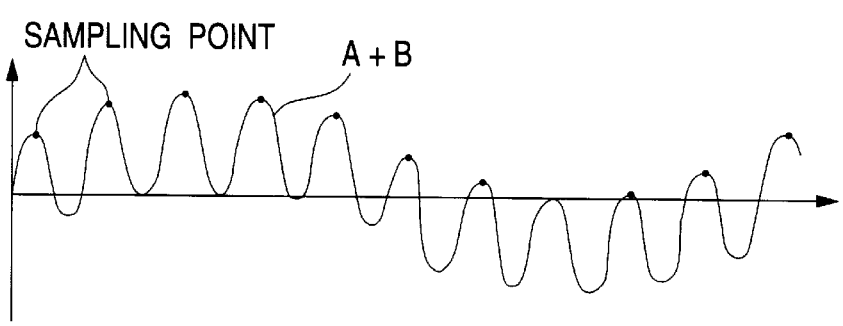
Figure 16D:
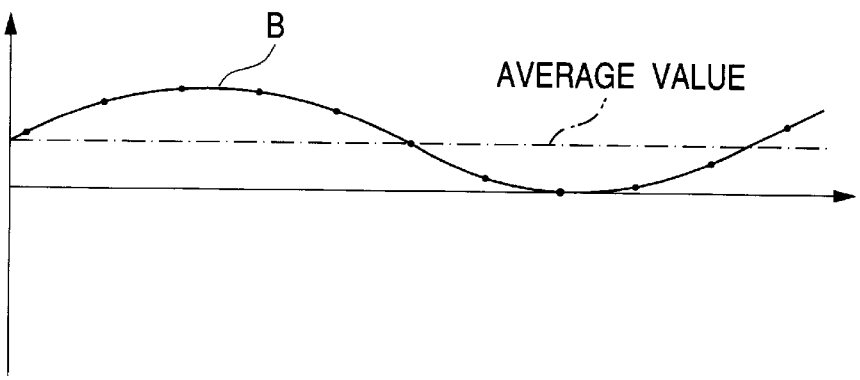

That is, in the embodiment, four sets of K, Y, M, and C color patterns 110*a* (K), 110*a* (Y), 110*a* (M), and 110*a* (C) formed linearly in the horizontal scanning direction are placed in parallel with each other on the transfer belt at given fine pitches along the vertical scanning direction for detecting rotation change in the vertical scanning direction and one set of K, Y, M, and C color patterns 110*b* (K), 110*b* (Y), 110*b* (M), and 110*b* (C) formed linearly along the vertical scanning direction are placed on the transfer belt at given fine pitches along one line in the vertical scanning direction for detecting rotation change in the horizontal scanning direction, as shown in FIG. 14A. A large number of the AC color shift detection patterns 110*a* (K), 110*a* (Y), 110*a* (M), and 110*a* (C) and 110*b* (K), 110*b* (Y), 110*b* (M), and 110*b* (C) are continuously formed along the move direction of the transfer belt 24 (for example, on the full periphery of the transfer belt 24) and are sampled.

As shown in FIG. 14B, K, Y, M, and C color patterns 110*b* (K), 110*b* (Y), 110*b* (M), and 110*b* (C) formed linearly along the vertical scanning direction may be placed long in parallel with each other along the vertical scanning direction for detecting rotation change in the horizontal scanning direction.

For the color shift detection patterns dedicated to AC component detection, 110*a* (K), 110*a* (Y), 110*a* (M), and 110*a* (C), for detecting rotation change in the vertical scanning direction, spacing P in the move direction of the transfer belt 24 is set corresponding to frequencies of cyclic rotation change occurring in the digital color copier, as shown in FIG. 14A. At the time, the frequencies of cyclic rotation change occurring in the digital color copier cover various frequency components such as the cycle of one periphery of the photosensitive drum 6K, 6Y, 6M, 6C, the cycle of one periphery of the drive roll 25 of the transfer belt 24, vibration and eccentric components of the gears for driving them, and walk of the transfer belt 24, as described above. Therefore, detecting all the frequencies at a time requires a very high sampling frequency. In fact, however, it is impossible to form patterns in response to very high sampling frequencies because of the pattern width, the operation time, etc.

Then, the embodiment provides a plurality of sets of AC component detection dedicated patterns and assigns detected frequency to each set of AC component detection dedicated patterns, thereby providing high AC color registration shift detection accuracy while suppressing sampling frequency. However, the embodiment is not limited to it; only one AC component detection dedicated pattern set is formed corresponding to a comparatively high sampling frequency and may be used to detect determined AC components, of course.

By the way, to detect AC components, it becomes difficult to obtain the number of repetitive sampling times as the frequency becomes low for convenience of the time required for detection. Therefore, how sampling accuracy of low frequencies is improved is at stake. Now, assume that AC oscillation frequencies of the digital color copier are A, B, and C (A>B>C). When the low frequency C is detected, sampling frequency is set to the high frequency A or B or its divisor; when C is sampled without a hitch, sampling frequency is set to the frequency of the common divisor of A and B, as shown in FIGS. 15A and 15B. For example, when A=30 Hz, B=20 Hz, and C=3 Hz, the sampling frequency is set to 10 Hz. On the other hand, when C is sampled with a hitch, the sampling frequency is set to the frequency prone to be more affected in accuracy or its divisor. For example, when A=30 Hz, B=5 Hz, and C=3 Hz, the sampling frequency is set to 10, 15, or 30 Hz. At this time, if the amplitude of either the oscillation component B or C is not small, it becomes difficult to separate B and C; for example, if the amplitude of the oscillation component B is small as compared with that of the oscillation component C, the oscillation component B can be ignored and it becomes possible to detect only the oscillation component C.

Since the oscillation components of the frequencies A and B can be made a dead zone, as shown in FIGS. 16A to 16D, by thus setting the sampling frequencies, detection and analysis of only the oscillation component C can be executed easily and sampling accuracy can also be improved.

Based on the theoretical consideration, in the embodiment, the sampling frequency of color shift detection pattern dedicated to AC component detection is set corresponding to high-frequency rotation change of cyclic rotation changes occurring in the digital color copier.

Now, assuming that the rotation frequency of the photosensitive drum 6 is 0.5 Hz and that the rotation frequency of the drive roll 25 of the transfer belt 24 is 5 Hz, the sampling frequency of color shift detection pattern 110 dedicated to AC component detection is set to 5 Hz equal to the higher rotation frequency of the drive roll 25 of the transfer belt 24. Resultantly, if the process speed of the digital color copier is 160 mm/sec, for patterns 110a (K), 110a (Y), 110a (M), and 110a (C) for detecting rotation change in the vertical scanning direction, of the color shift detection pattern 110 dedicated to AC component detection, spacing P between patterns of the same color in the move direction of the transfer belt 24, as shown in FIGS. 14A and 14B, is set to 160 (mm/sec)÷5 (Hz)=32 (mm), for example, and spacing p between adjacent patterns different in color is set to 8 mm. However, the setting is not limited to it; if the sampling frequency is set to 2.5 Hz (a half of 5 Hz), spacing P between the patterns of the same color may be set to about 64 mm.

Even to form color shift detection patterns under limited conditions, the color image formation system of the configuration according to the embodiment can detect an AC color registration shift with good accuracy and provide sufficient data as information for actively controlling the drive system of the rotation bodies such as the photosensitive drums and the transfer belt and reducing the AC color registration shift as described below:

In the digital color printer, change in internal temperature of the machine or application of an external force to the digital color printer causes subtle change in the positions or sizes of the image formation units 5K, 5Y, 5M, 5C themselves and furthermore subtle change in the positions or sizes of the parts in the image formation units. The internal temperature change and external force are inevitable; for example, routine work such as a recovery from a paper jam, parts replacement in maintenance, or a move of the digital color printer applies an external force to the digital color printer. When internal temperature change or an external force acts on the digital color printer, registration of images formed in the color image formation units 5K, 5Y, 5M, and 5C worsens and a DC color registration shift occurs, making it difficult to maintain high image quality.

An AC color registration shift at comparatively high frequency changing in short cycles, such as the cycle of one periphery of the photosensitive drum 6, the cycle of one periphery of the drive roll 25 of the transfer belt 24, vibration and eccentric components of the gears for driving them, or walk of the transfer belt 24, also occurs in the digital color printer.

By the way, to meet demand for furthermore high image quality in the digital color printer, a color registration shift needs to be suppressed to about 70 µm or less, for example, with high accuracy. To do this, it may become necessary to reduce the absolute amounts of color registration shifts of DC and AC components by improving manufacturing accuracy of the image formation units and the transfer belt, accuracy of the drive, etc., and perform active control so as to detect rotation change of the drive system of the photosensitive drums, the transfer belt, etc., at any time or whenever necessary and cancel out the color registration shift effect of AC components.

Then, the digital color printer performs DC color shift detection pattern sampling operation and correction mode operation based thereon and performs AC color shift detection pattern sampling operation and predetermined operation based thereon as required before the normal image formation mode (print mode) is started, during the normal image formation mode (print mode), etc., when the printer power is turned on, after recovery operation from a paper jam is performed, or at any other predetermined timing. At the time, the AC color shift detection pattern sampling operation and the predetermined operation based thereon may be performed each time the DC color shift detection pattern sampling operation and the correction mode operation based thereon are performed; however, in the embodiment, the AC color shift detection pattern sampling operation and the predetermined operation based thereon are performed only once in a color shift correction cycle just after the printer power is turned on.

Figure 17:
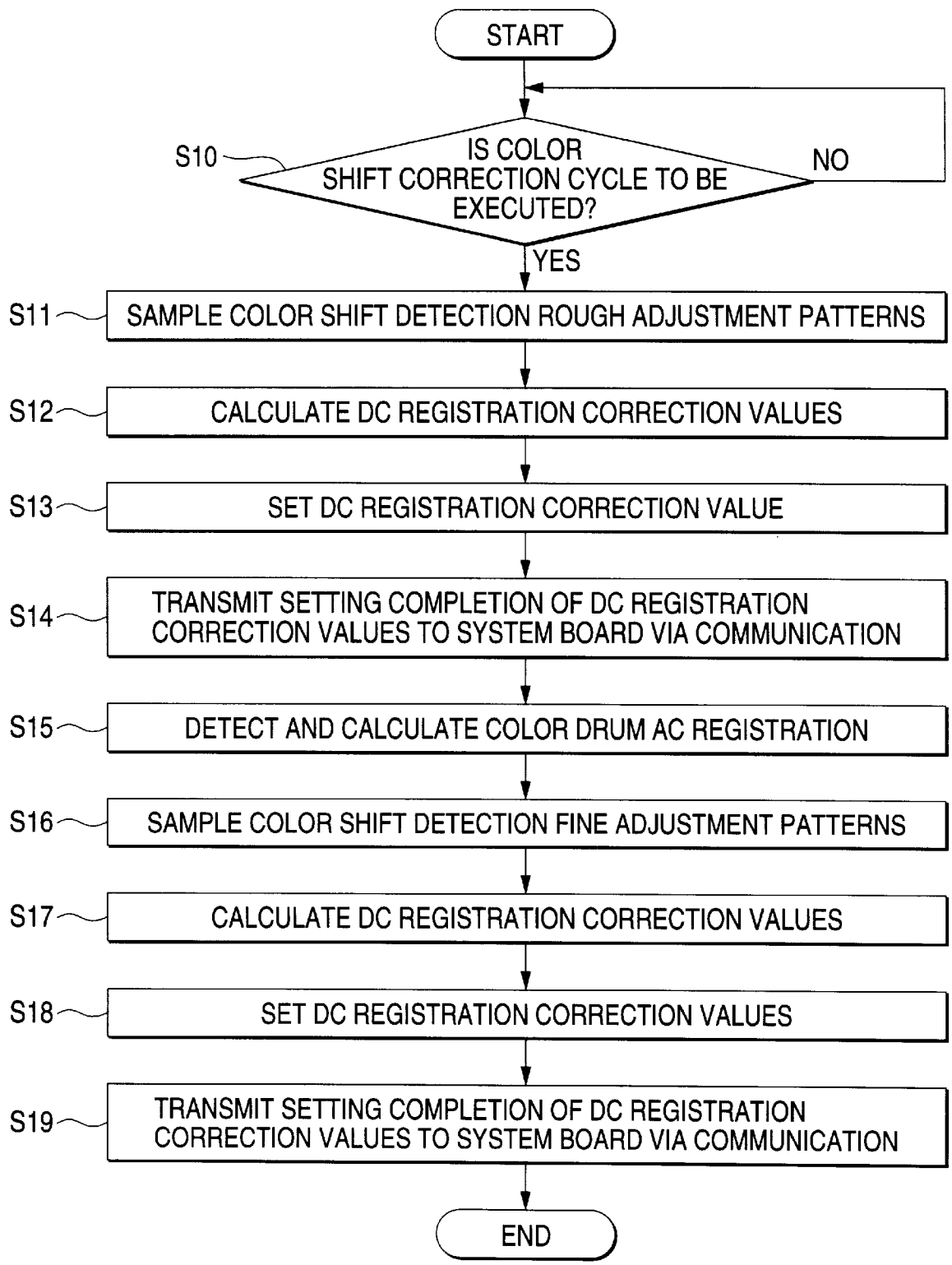
FIG. 17 is a flowchart showing color shift correction operation.

Further, in the embodiment, as shown in FIG. 17, first whether or not a color shift correction cycle is to be executed is determined at step S10. If the color shift correction cycle is to be executed, color shift detection rough adjustment patterns are sampled at step S11. The color shift detection rough adjustment patterns are set to larger pitches than the DC color shift detection patterns 71 shown in FIG. 12 and are provided for roughly adjusting DC color shift. In sampling the color shift detection rough adjustment patterns, rough adjustment pattern sample data is read and sampling data operation is performed to find the image position. When the image positions are found for all sampling data, DC registration correction values are calculated at step S12 and are set at step S13. Upon completion of setting the DC registration correction values, the completion is transmitted to a system board via communication at step S14.

Next, as described later, the color shift detection pattern 110 dedicated to AC component detection formed on the transfer belt 24 is detected and calculated at step S15, then color shift detection fine adjustment patterns are sampled at step S16. The color shift detection fine adjustment patterns, which are as shown in FIG. 12, are provided for finely adjusting DC color shift. In sampling the color shift detection fine adjustment patterns, fine adjustment pattern sample data is read and sampling data operation is performed to find the image position. When the image positions are found for all sampling data, DC registration correction values are calculated at step S17 and are set at step S18. Upon completion of setting the DC registration correction values, the completion is transmitted to the system board via communication at step S19. The correction cycle is now complete.

At the time, if an AC component detection and correction cycle is executed before the completion of the rough adjustment in the DC color registration correction cycle just after the printer power is turned on, DC color registration variation exists, thus if the AC color shift detection pattern sampling period is shortened, there is a possibility that preceding and following patterns of other colors will overlap. Unless many sampling areas are taken at the sampling time, there is a fear that patterns will not enter the sampling areas. Efficient sampling cannot be performed. Thus, the pattern spacing cannot be shortened. In contrast, DC color registration variation lessens at least after the completion of the rough adjustment in the DC color registration correction cycle. Thus, the pattern spacing can be shortened. When a DC color registration correction is made, DC component detection accuracy is high if sampling is performed in the small amount state of AC component rather than the state in which a large amount of AC component remains. Therefore, AC component correction needs to be completed before a fine adjustment is made. Thus, preferably the AC color registration correction cycle is inserted between rough and fine adjustments in DC color registration correction cycle, whereby when fine adjustment of DC color registration correction is made, the AC component effect can be lessened and more accurate DC color registration correction is enabled.

Next, the AC color shift detection pattern sampling operation and the control operation based thereon will be discussed in detail.

First, in the AC color shift detection pattern sampling operation and the control mode based thereon, as shown in FIG. 6, the control board 78 issues commands to the sections and the interface boards 75K, 75Y, 75M, and 75C start outputting image data of AC color shift detection pattern 110 to the corresponding image formation units 5K, 5Y, 5M, and 5C in sequence by color shift detection pattern output means contained in the interface boards. At this time, the timing at which each of the interface boards 75K, 75Y, 75M, and 75C starts outputting the image data is the same as the timing of the normal image formation mode (print mode). Thus, the image formation units 5K, 5Y, 5M, and 5C form predetermined color shift detection patterns 110 based on the image data and multiple-transfer the color shift detection patterns 110 to the transfer belt in sequence at the same timings as the normal image formation mode (print mode) for forming the color shift detection pattern 110 on the transfer belt 24.

Figure 18:
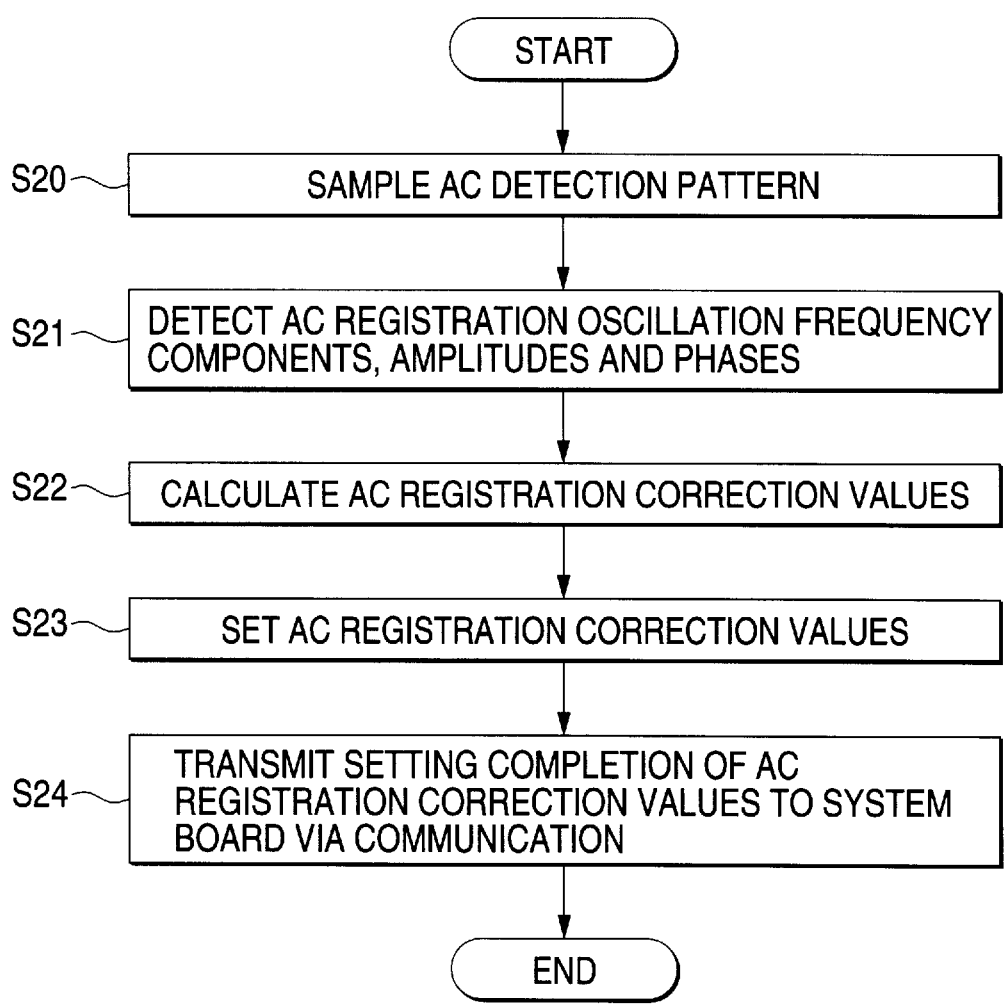
FIG. 18 is a flowchart showing color shift correction operation.

In the detection and calculation subroutine of the color shift detection pattern 110 dedicated to AC component detection, as shown in FIG. 18, sample data of the color shift detection pattern 110 dedicated to AC component detection is read at step S20, and sampling data operation is performed for detecting oscillation frequency component, amplitude, and phase of AC registration shift of each color at step S21. When the oscillation frequency component, amplitude, and phase of AC registration shift are found for all sampling data, AC registration correction values are calculated at step S22 and are set at step S23. Upon completion of setting the AC registration correction values, the completion is transmitted to the system board via communication at step S24. The AC registration correction cycle is now complete.

Next, a specific sampling and correction algorithm of the color shift detection pattern dedicated to AC component detection will be discussed.

Figure 19:
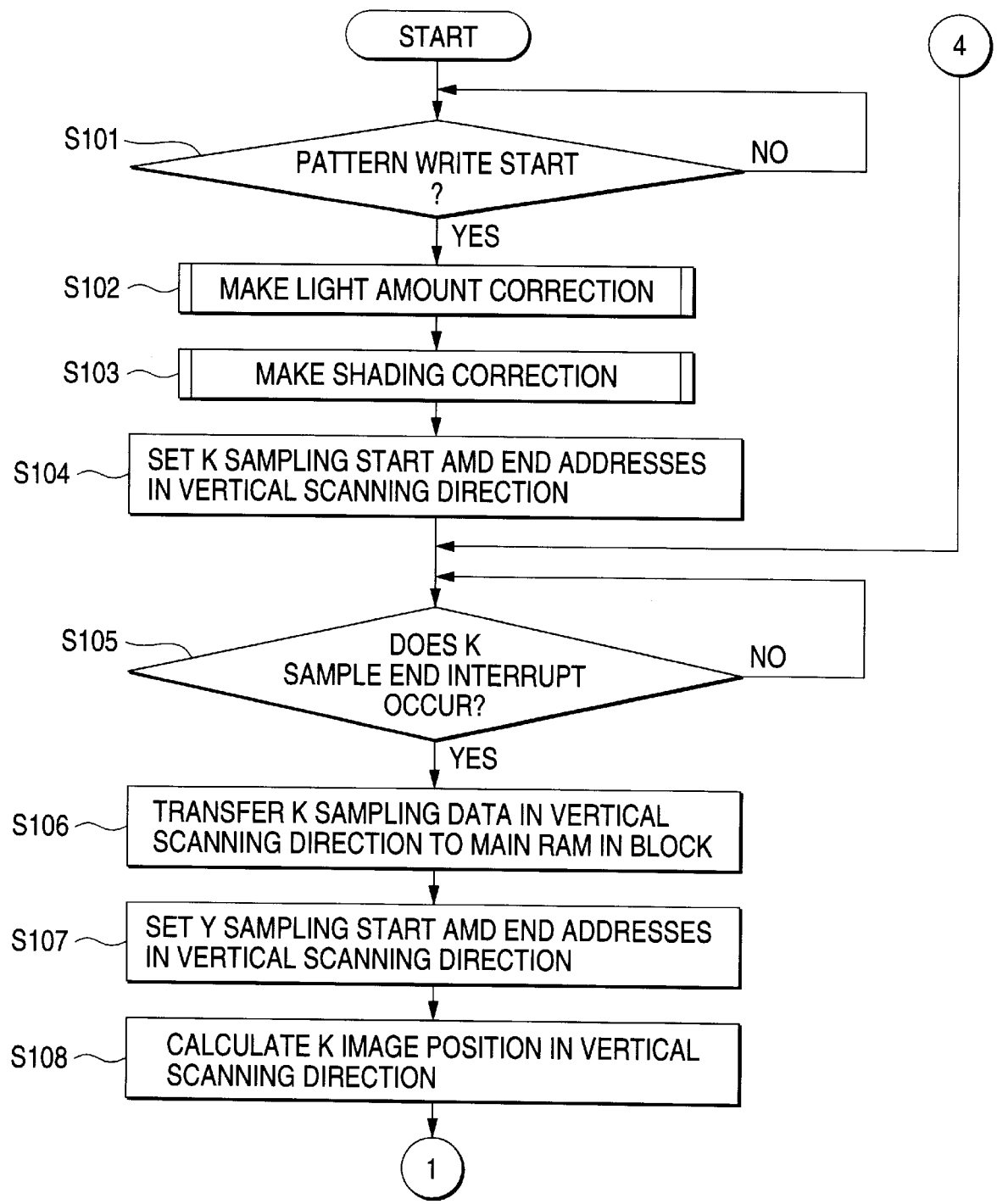
FIG. 19 is a flowchart showing the operation of a color shift detection pattern sampling system according to the embodiment.

In sampling the color shift detection pattern 110 dedicated to AC component detection, as shown in FIG. 19, a wait is made for pattern write to be started at step S101, light amount correction and shading correction are made at steps S102 and S103, and K data sampling start and end addresses in the vertical scanning direction are set at step S104.

A wait is made until a K data sampling end interrupt occurs at step S105, and the sampling data in the vertical scanning direction (K data) is transferred to the main RAM 100 in block at step S106.

Subsequently, Y data sampling start and end addresses in the vertical scanning direction are set at step S107, then the image position of the K data in the vertical scanning direction is calculated at step S108.

Figure 20:
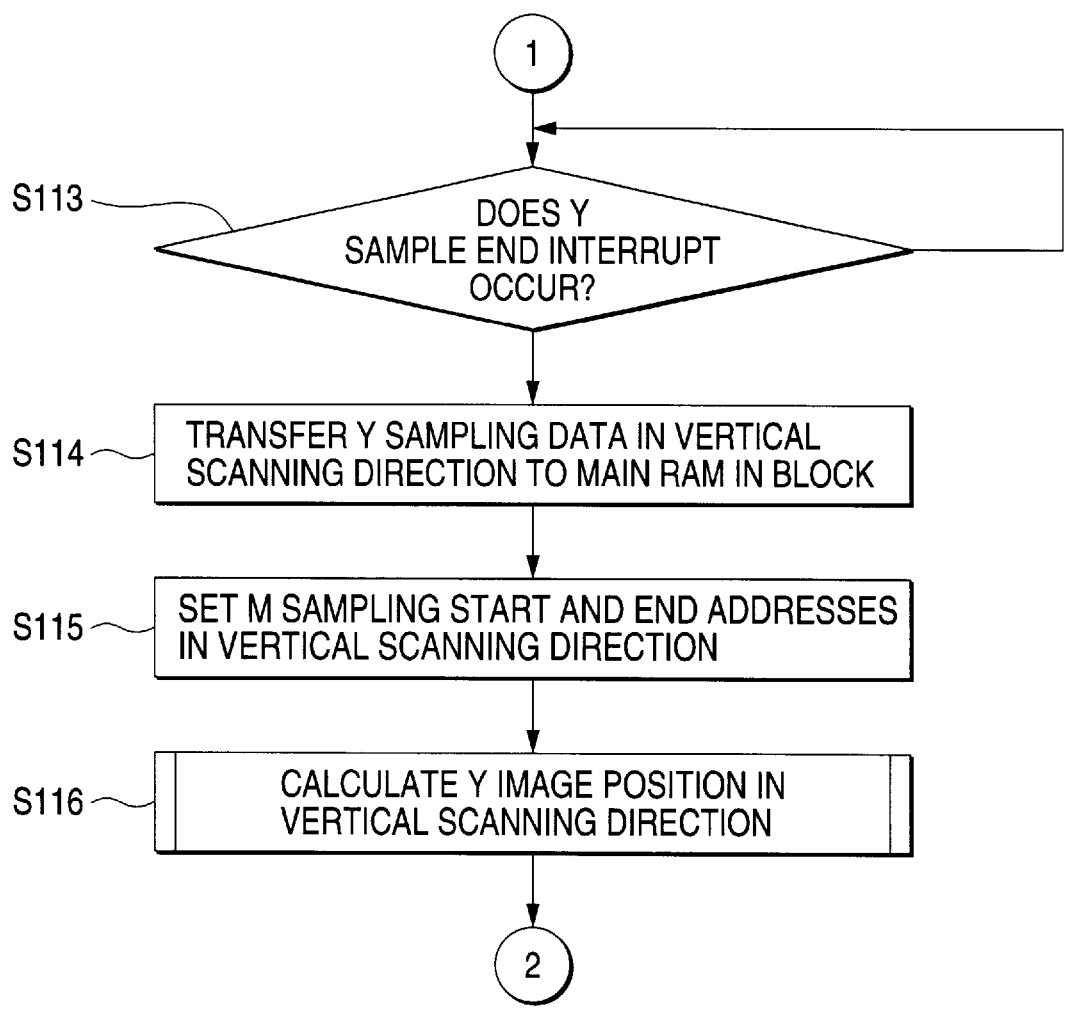
FIG. 20 is a flowchart showing the operation of the color shift detection pattern sampling system according to the embodiment.

Next, as shown in FIG. 20, a wait is made until a Y data sampling end interrupt occurs at step S113, and the sampling data in the vertical scanning direction (Y data) is transferred to the main RAM 100 in block at step S114, then M data sampling start and end addresses in the vertical scanning direction are set at step S115 and the image position of the Y data in the vertical scanning direction is calculated at step S116.

Figure 21:
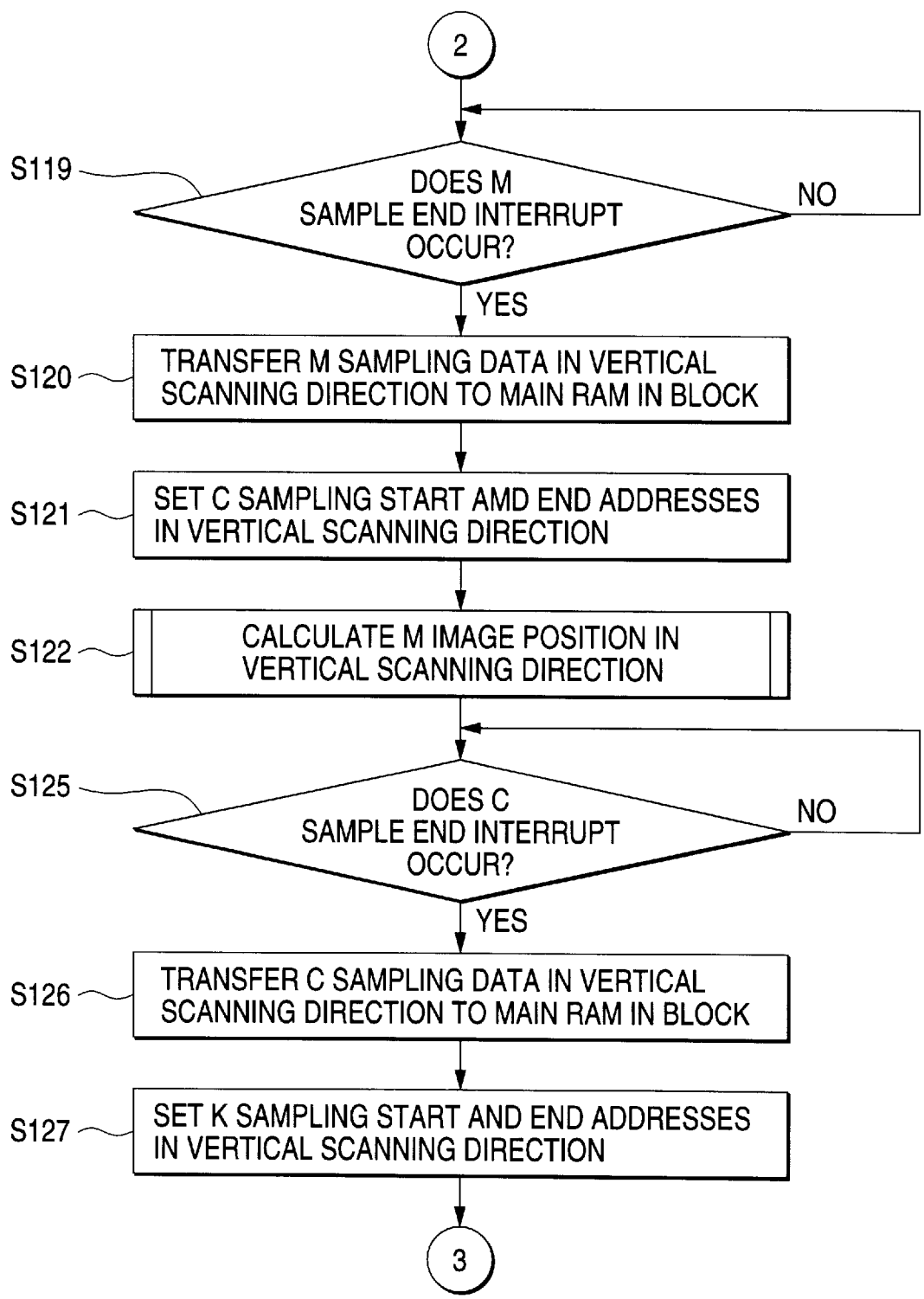
FIG. 21 is a flowchart showing the operation of the color shift detection pattern sampling system according to the embodiment.
Figure 22:
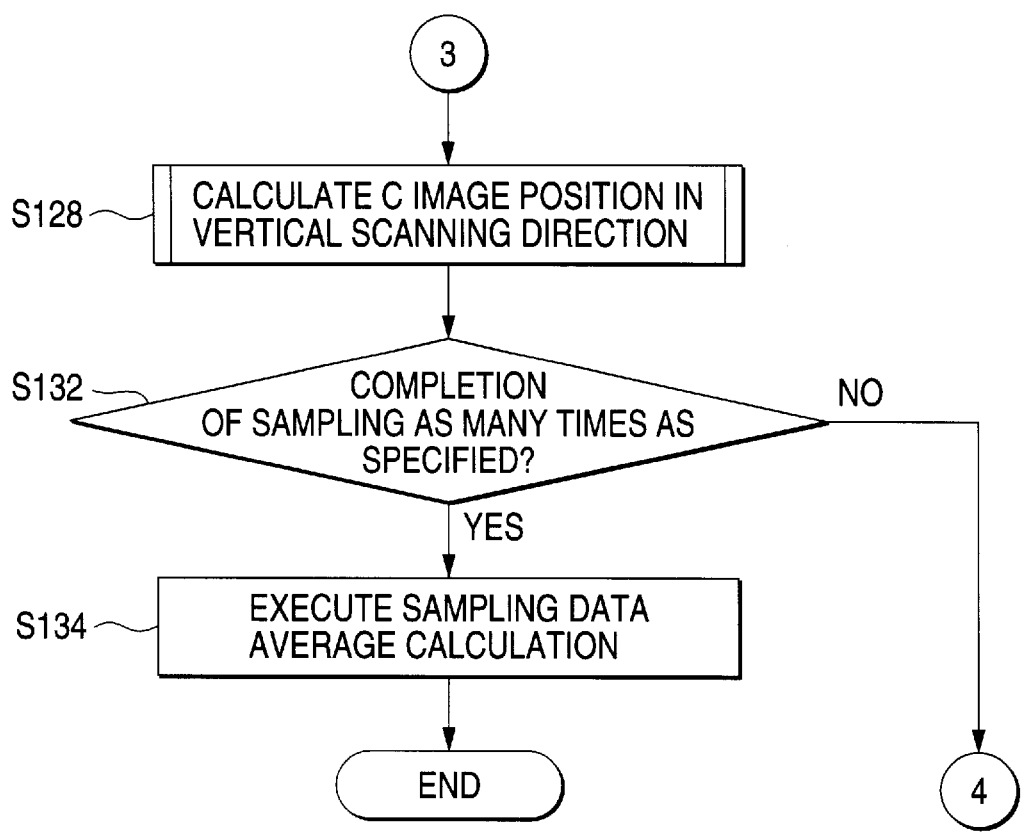
FIG. 22 is a flowchart showing the operation of the color shift detection pattern sampling system according to the embodiment.

Next, as shown in FIG. 21, a wait is made until an M data sampling end interrupt occurs at step S119. Likewise, as shown in FIGS. 21 and 22, M data and C data are processed at steps S120–S131. Control returns to step S105 and the steps are repeated until completion of sampling as many times as specified. Upon completion of sampling as many times as specified at step S132, sampling data average calculation is executed at step S134.

Figure 23:
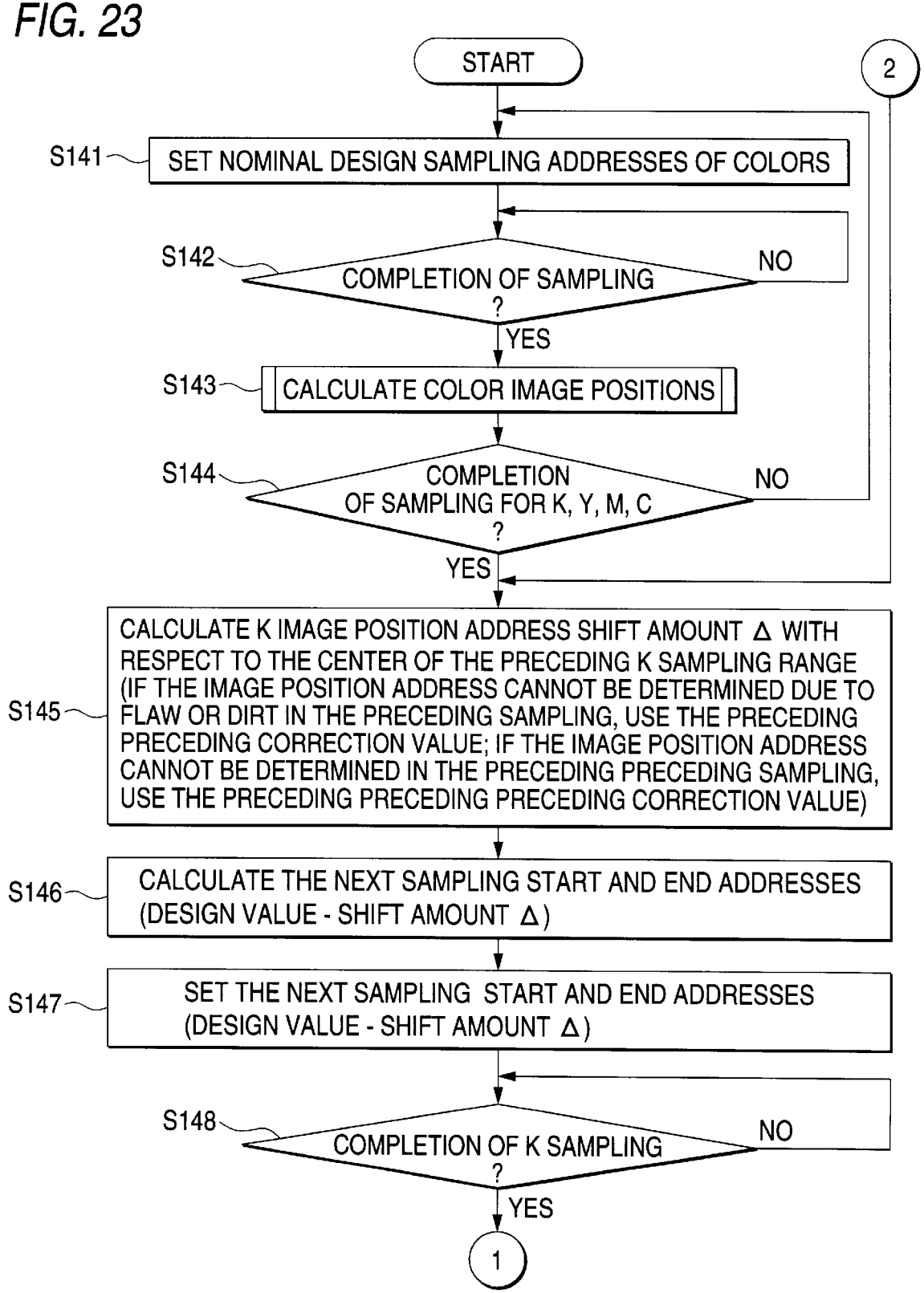
FIG. 23 is a flowchart showing the operation of the color shift detection pattern sampling system according to the embodiment.

In vertical scanning sampling start point correction, as shown in FIG. 23, first the nominal design sampling addresses of colors are set at step S141 and a wait is made until completion of sampling at step S142. The image positions of the colors are calculated at step S143. Similar processing is performed repeatedly until completion of sampling for K, Y, M, and C at step S144.

Next, K image position address shift amount Δ with respect to the center of the preceding K sampling range is calculated at step S145. If the image position address cannot be determined due to dirt, etc., in the preceding sampling, the preceding preceding correction value is used; if the image position address cannot be determined in the preceding preceding sampling, the preceding preceding preceding correction value is used.

The next sampling start and end addresses of pattern perpendicular to the belt travel direction of K are calculated from (design value—shift amount A) at step S146 and are set at step S147. A wait is made for K sampling completion at step S148. However, if step S145 can be skipped if it is not required in the system. At the time, K-to-K sampling start intervals are made constant.

Figure 24:
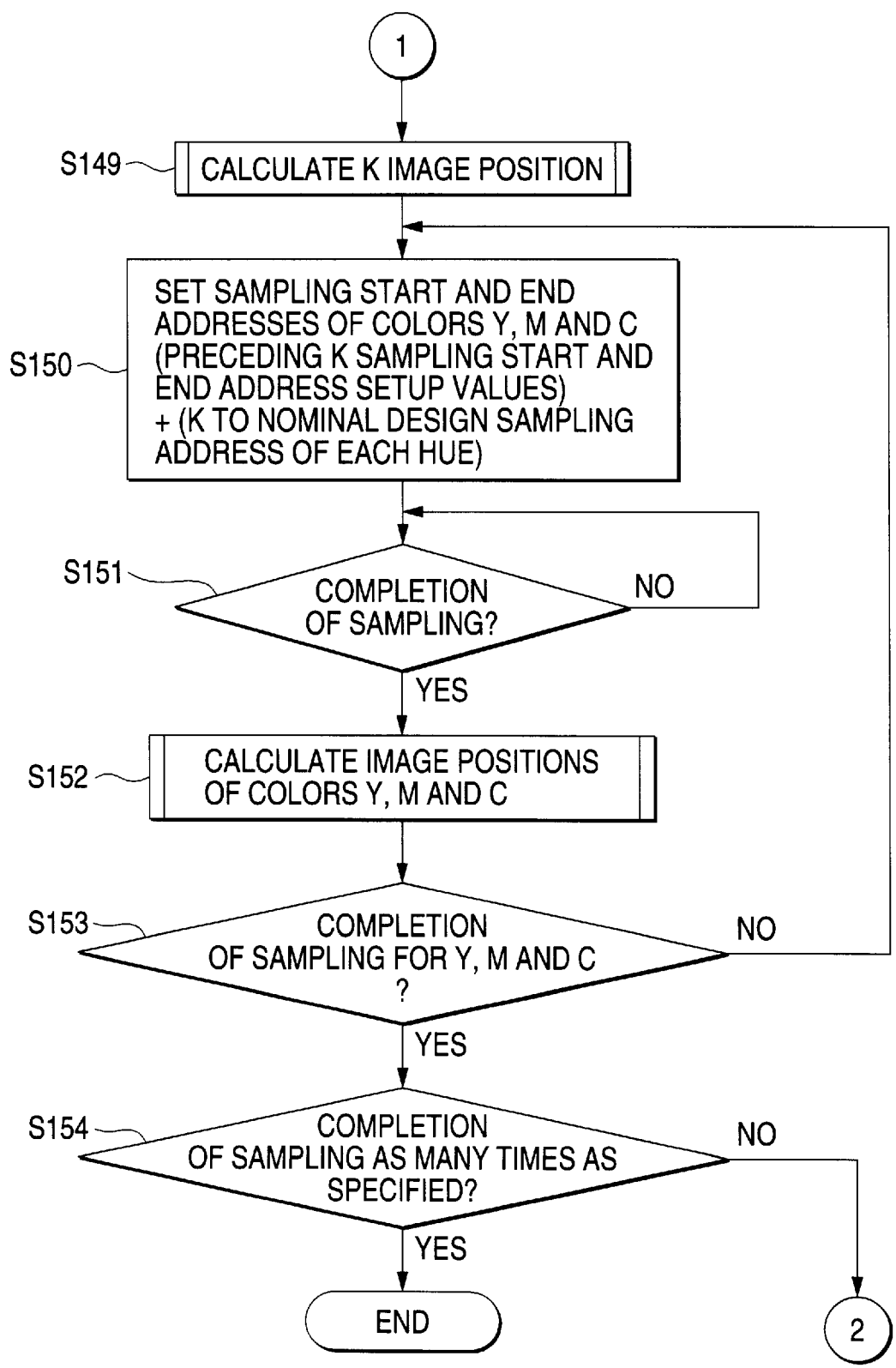
FIG. 24 is a flowchart showing the operation of the color shift detection pattern sampling system according to the embodiment.

Next, as shown in FIG. 24, the K image position is calculated at step S149. The sampling start and end addresses of colors Y, M, and C are set at step S150, and a wait is made for sampling completion at step S151. K-Y, Y-M, and M-C are made constant values. Correction of shift caused by the sampling method executed when AC component is detected needs to be made simply by evenly correcting the sampling range correction value of K corrected at steps S145–S147, so that the number of calculation steps is reduced. Next, the image positions of the colors Y, M, and C are calculated at step S152.

The process starting at step S150 is repeated until completion of sampling Y, M, and C at step S153. Further, the process starting at step S145 is repeated until completion of sampling as many times as specified at step S154.

Figure 25:
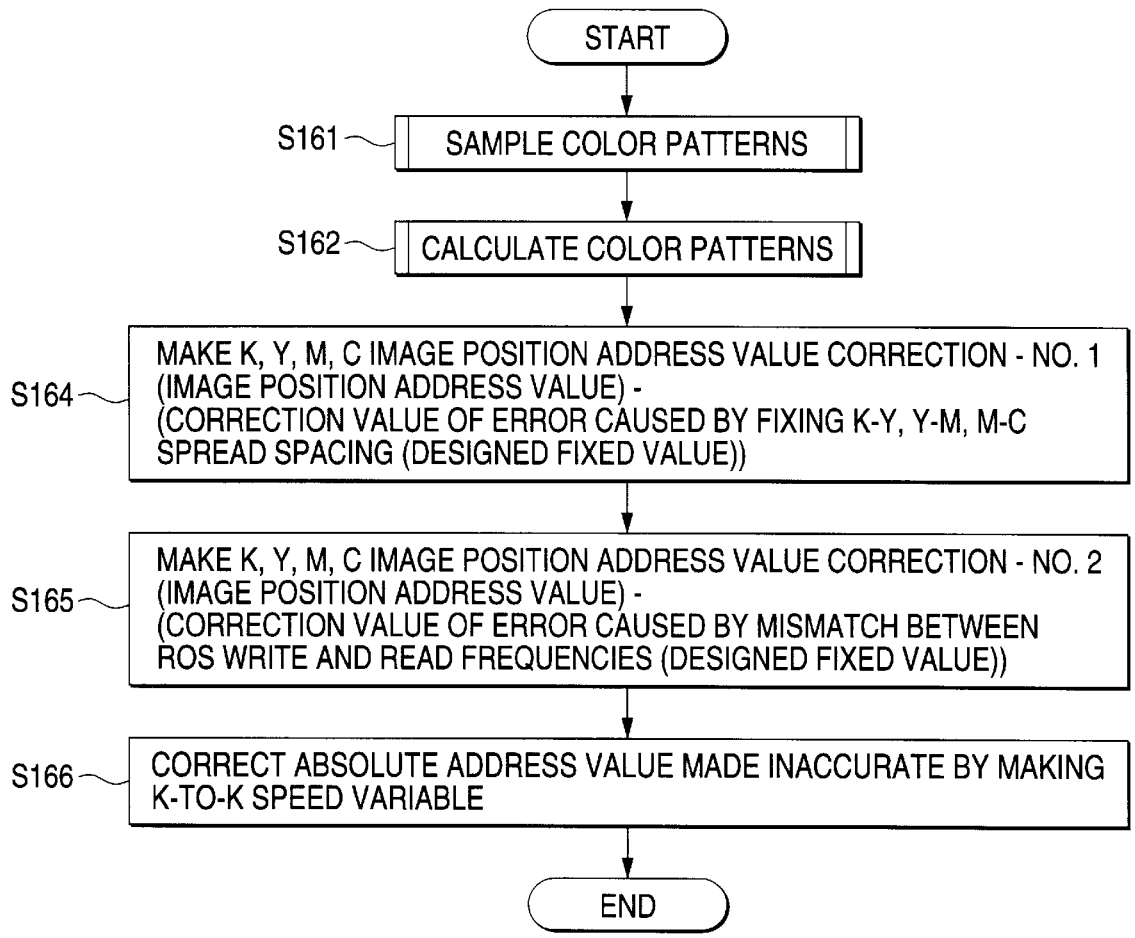
FIG. 25 is a flowchart showing the operation of the color shift detection pattern sampling system according to the embodiment.

In address error correction of each color for K after sampling, as shown in FIG. 25, color patterns are sampled at; step S161 and image position addresses are calculated at step S162 in sequence. (Correction value of error caused by fixing K-Y, Y-M, M-C spread spacing (setup fixed value)) is subtracted from the image address found for each sample pattern of K, Y, M, and C at step S164. Correction of error by making K spread start point correction (Image address found for each sample pattern of K, Y, M, and C)–(K spread correction)

(Correction value of error caused by mismatch between ROS write and CCD read frequencies (setup fixed value)) is subtracted from the image address found for each sample pattern of K, Y, M, and C at step S165.

As a result, the absolute addresses for each color, each pattern can be found and analyzed, thereby detecting AC component at step S166.

An ideal image profile when the AC registration shift: measurement pattern 110 is read generally becomes as shown in FIG. 11. A center-of-gravity method is used to find the center of the pattern image and the operation is repeated to find an average, whereby a precise image position address can be determined.

The color shift detection patterns in the horizontal scanning direction are also sampled as described above.

Figure 26:
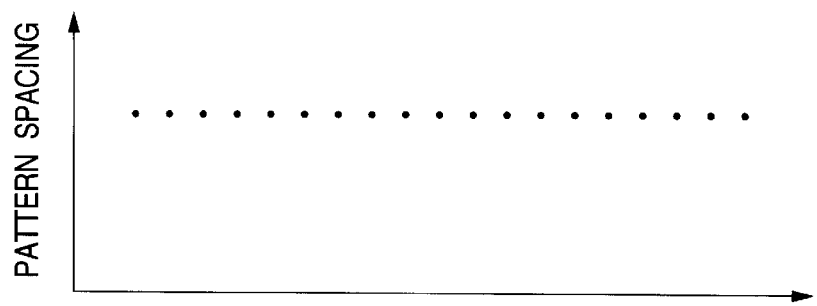
FIG. 26 is a graph showing a rotation phase detection method of a photosensitive drum.
Figure 27:
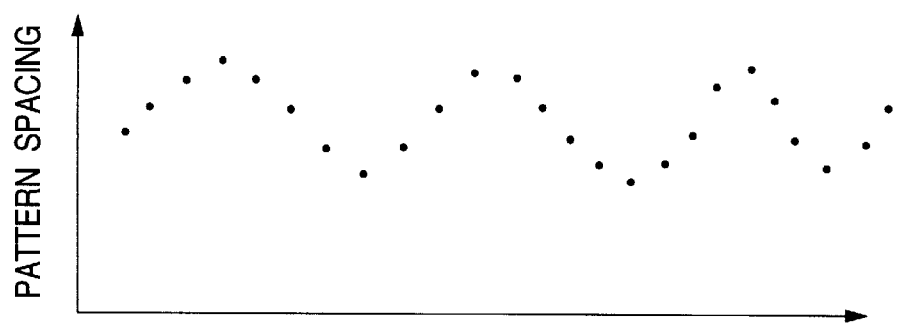
FIG. 27 is a graph showing a rotation phase detection method of a photosensitive drum.

By the way, for the sampling data of the color shift detection pattern 110 dedicated to AC component detection, the black, yellow, magenta, and cyan AC color shift detection patterns 110 should be spaced from each other uniformly as shown in FIG. 26 unless an AC component color registration shift occurs in the digital color copier. However, the actual digital color copier contains rotation changes over frequency components, such as the cycle of one periphery of the photosensitive drum 6, the cycle of one periphery of the drive roll 25 of the transfer belt 24, vibration and eccentric components of the gears for driving them, and walk of the transfer belt 24. Thus, the black, yellow, magenta, and cyan color shift detection patterns 110 are not uniformly spaced from each other as shown in FIG. 27, and a color registration shift of AC component cyclically changing occurs.

Figure 28A:
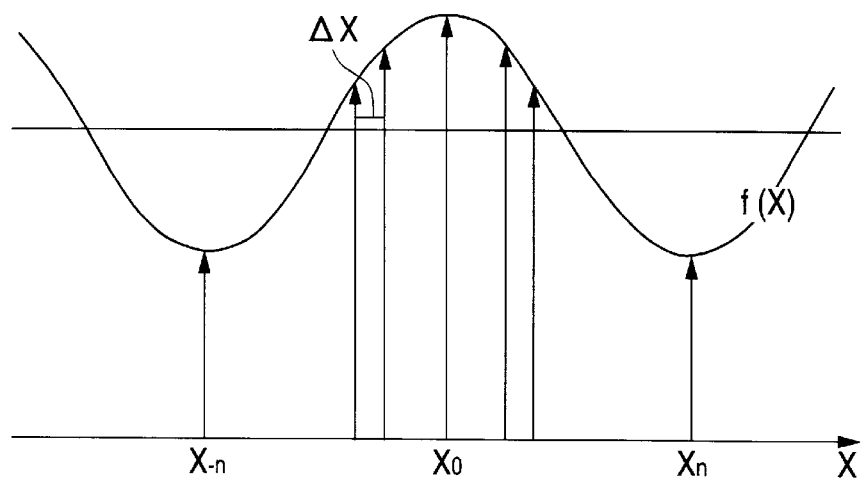
FIGS. 28A and 28B are graphs each showing a rotation phase detection method of a photosensitive drum.
Figure 28B:
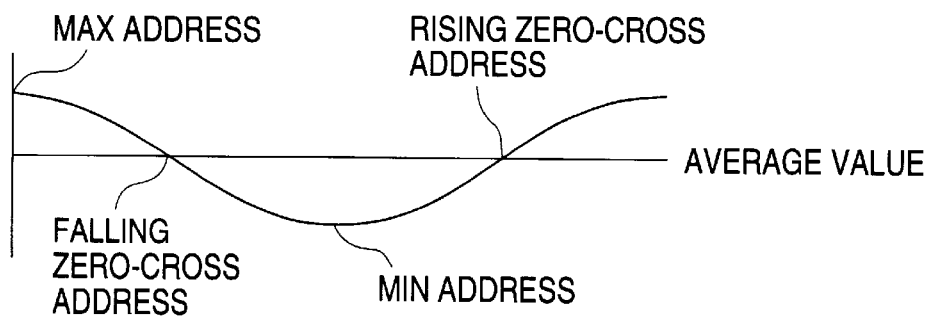

Then, in the embodiment, the oscillation frequency component, amplitude, and phase of AC registration shift of each color are detected based on the sampling data of the spacing between the black, yellow, magenta, and cyan color shift detection patterns 110 stored in the main RAM 100 (step S21). To detect the oscillation frequency component, amplitude, and phase of AC registration shift of each color, first, spacing data between the black, yellow, magenta, and cyan color shift detection patterns 110 is sampled in response to the sampling frequency, and an average value is calculated based on the following expression, as shown in FIG. 28 (a):

Average value=$\Sigma(f(X)/n)$ where $\Sigma$ is assumed to take $X_{-n}$ to $X_n$.

For the sampling data of the spacing between the black, yellow, magenta, and cyan color shift detection patterns 110, a rising zero-cross address and a falling zero-cross address at which average value data is set to zero are found and the oscillation frequency component and phase of AC registration shift of each color are found from the rising and falling zero-cross addresses. At the time, the phase of the AC registration shift of each color is found with the phase of the black pattern as the reference. To find the amplitude of the AC registration shift of each color, the maximum and minimum values are found and the minimum value is subtracted from the maximum value.

When the oscillation frequency components, amplitudes, etc., of the AC registration shifts for all sampling data are found, correction data operation is performed and correction data is transmitted (step S24).

Thus, the embodiment provides the color shift detection pattern 110 dedicated to AC component detection for detecting cyclic rotation change occurring in the digital color copier. Even if the color shift detection pattern 110 dedicated to AC component detection is formed under limited conditions, cyclic rotation change occurring in the digital color copier may be considered to form the color shift detection pattern 110. An AC color registration shift can be detected with good accuracy according to the color shift detection pattern 110 for detecting cyclic rotation change occurring in the digital color copier, and sufficient data as information for actively controlling the drive system of the rotation bodies such as the photosensitive drums 6 and the transfer belt 24 and reducing the AC color registration shift can be provided.

In the embodiment, the sampling frequency of the AC color shift detection pattern 110 is set corresponding to the frequency of the rotation change to be detected among cyclic rotation changes occurring in the digital color copier. Thus, even if there are a plurality of cyclic rotation changes occurring in the image formation system, a specific cyclic rotation change can be detected with good accuracy.

In the embodiment, the sampling frequency of the color shift detection pattern 110 is set corresponding to higher-frequency rotation change among cyclic rotation changes occurring in the digital color copier. Thus, as seen from the sampling theorem, only low-frequency rotation change can be detected without detecting high-frequency rotation change.

In the embodiment, the color shift detection patterns 110 consist of patterns repeatedly formed in a predetermined spacing along the move direction of the transfer belt 24 and patterns formed in a direction perpendicular to the move direction of the transfer belt 24 and the patterns formed along the move direction of the transfer belt 24 and the patterns formed in the direction perpendicular to the move direction of the transfer belt 24 are sampled separately. Thus, the patterns in the move direction of the transfer belt 24 and the patterns in the direction perpendicular to the move direction are sampled separately, whereby even if the pattern spacing along the move direction of the transfer belt 24 is narrow, sufficient data processing time can be provided.

In the embodiment, the color shift detection patterns 110 are sampled after the termination of at least either of rough and fine adjustments of a DC color registration correction cycle just after power of the copier is turned on. Thus, when an AC color registration shift is detected, at least the rough adjustment of the DC color registration correction cycle terminates. The color shift detection patterns 110 for detecting cyclic rotation change occurring in the digital color copier can be formed with good accuracy and the color shift detection patterns 110 can be reliably prevented from overlapping each other. Further, if the AC color shift detection pattern 110 sampling and correction cycle is performed between rough and fine adjustments in the DC color registration correction cycle just after the copier power is turned on, the subsequent fine adjustment in the DC color registration correction cycle can be made with good accuracy.

Embodiment 2

Figure 29:
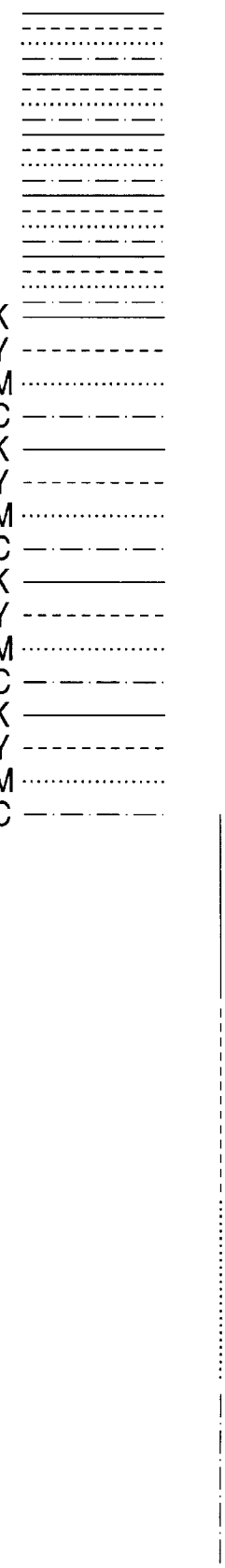
FIG. 29 is a plan view to show AC registration shift measurement patterns according to a second embodiment of the invention.

FIG. 29 shows a second embodiment of the invention. Parts identical with or similar to those previously described in the first embodiment are denoted by the same reference numerals in the second embodiment. The second embodiment provides a plurality of AC color shift detection patterns. For the AC color shift detection patterns 110*a* (K), 110*a* (Y), 110*a* (M), and 110*a* (C) and 110*b* (K), 110*b* (Y), 110*b* (M), and 110*b* (C), the patterns formed along the move direction of a transfer belt 24 are unevenly spaced from each other so that cyclic rotation changes occurring in a digital color copier can be detected. A large number of the AC color shift detection patterns 110*a* (K), 110*a* (Y), 110*a* (M), and 110*b* (C) and 110*b* (K), 110*b* (Y), 110*b* (M), and 110*b* (C) are also formed continuously along the move direction of the transfer belt 24 (for example, on the full periphery of the transfer belt 24) and are sampled.

A plurality of the AC color shift detection patterns 110 are thus provided, whereby even if there are a plurality of cyclic rotation changes occurring in the digital color copier, they can be detected with good accuracy according to the color shift detection patterns.

Embodiment 3

Figure 30:
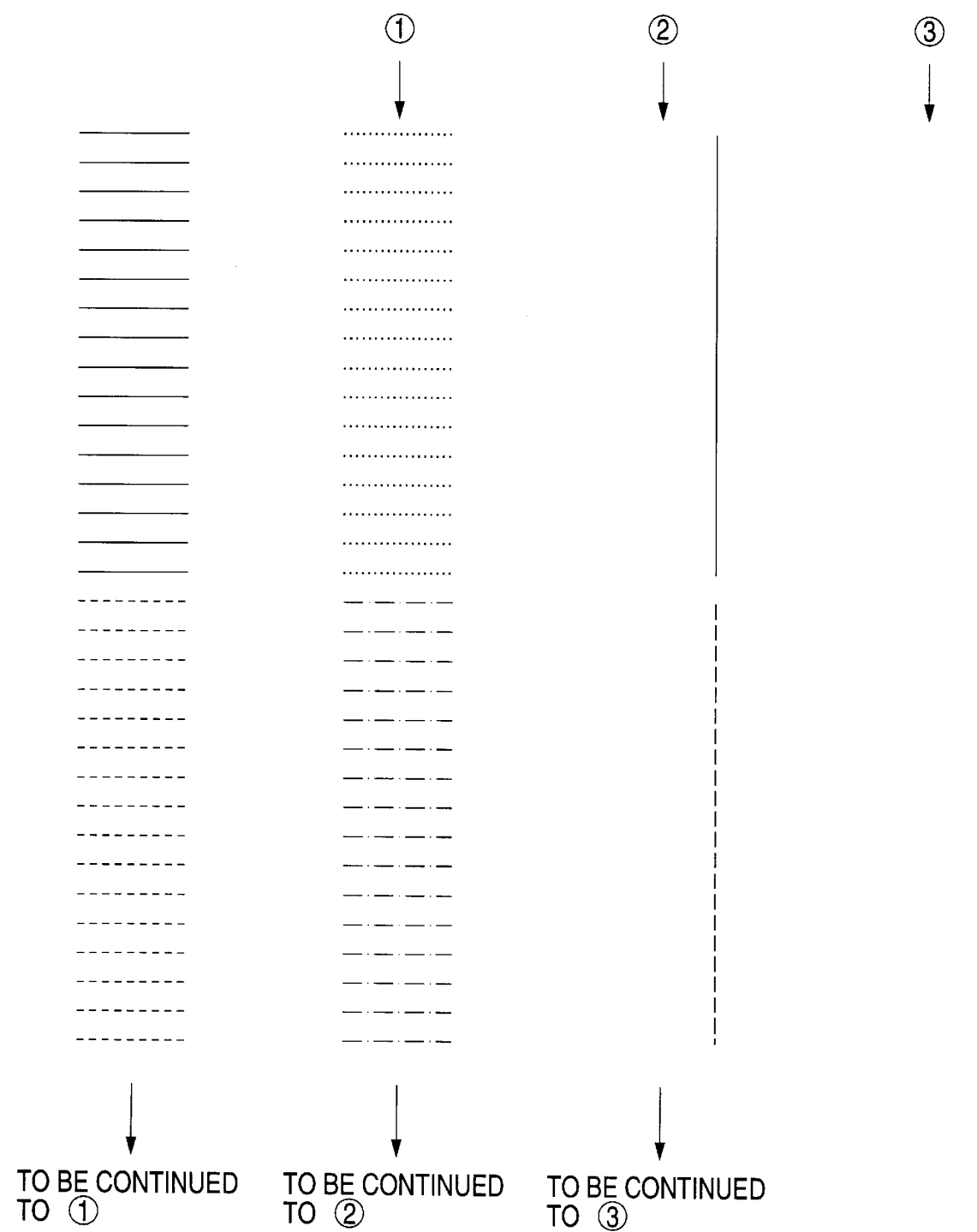
FIG. 30 is a plan view showing AC registration shift measurement patterns according to a third embodiment of the invention.

FIG. 30 shows a third embodiment of the invention. Parts identical with or similar to those previously described in the first and second embodiments are denoted by the same reference numerals in the third embodiment. In the third embodiment, color shift detection patterns 110*a* (K), 110*a* (Y), 110*a* (M), and 110*a* (C) and 110*b* (K), 110*b* (Y), 110*b* (M), and 110*b* (C) are formed continuously for each color and are sampled separately for each color. A large number of the AC color shift detection patterns 110*a* (K), 110*a* (Y), 110*a* (M), and 110*a* (C) and 110*b* (K), 110*b* (Y), 110*b* (M), and 110*b* (C) are also formed continuously along the move direction of a transfer belt 24 (for example, on the full periphery of the transfer belt 24) and are sampled.

Since the AC color shift detection patterns 110 are sampled separately for each color, pattern spacing of each color can be set narrow and even if the frequency of cyclic rotation change occurring in the image formation system, the change can be detected with good accuracy.

Figure 31:
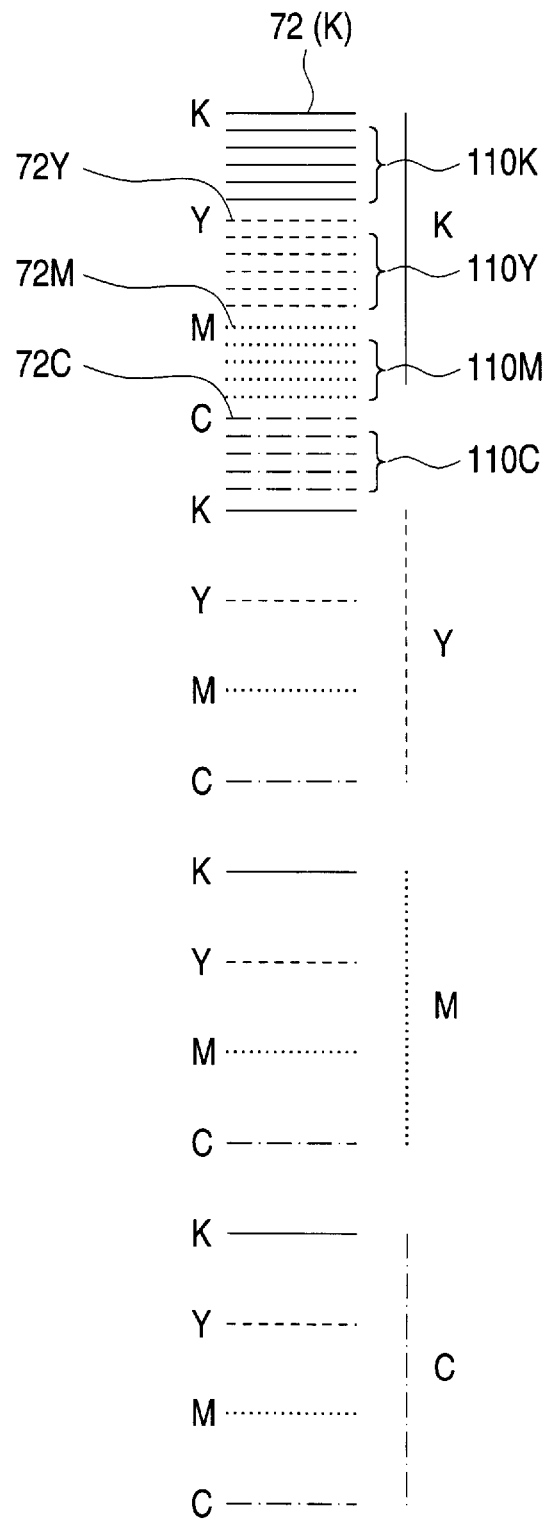
FIG. 31 is a plan view showing AC registration shift measurement patterns according to the third embodiment of the invention.
Figure 32:
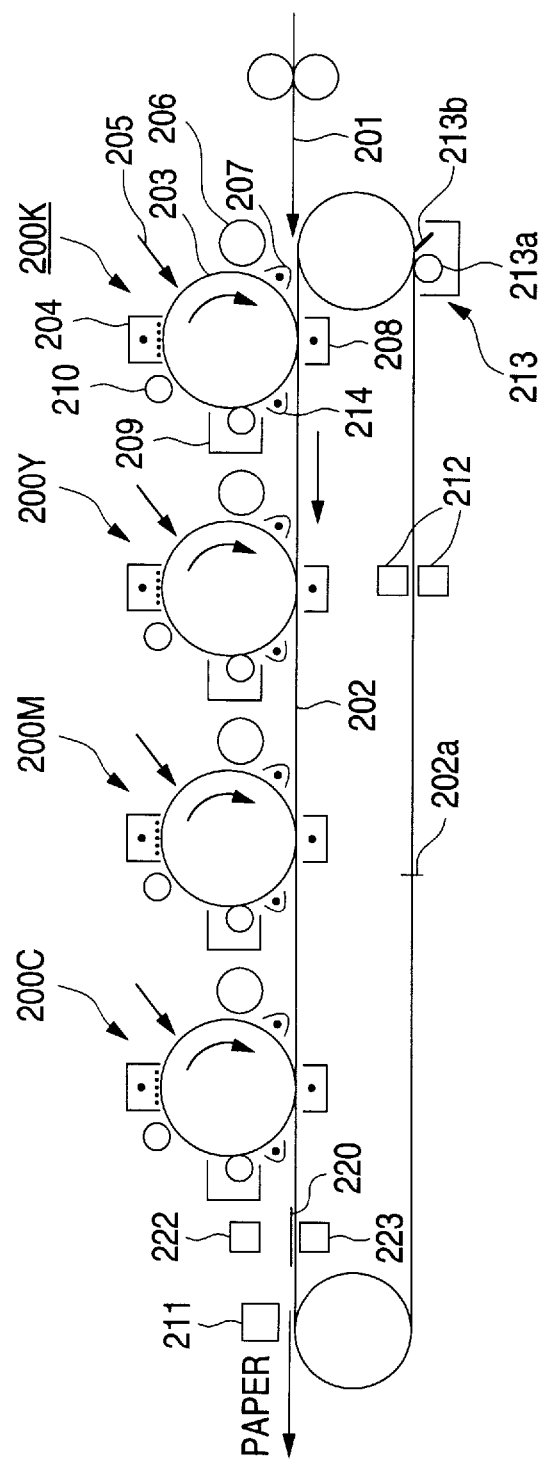
FIG. 32 is a block diagram showing a digital color copier to which a conventional color shift detection pattern sampling system is applied.
Figure 33:
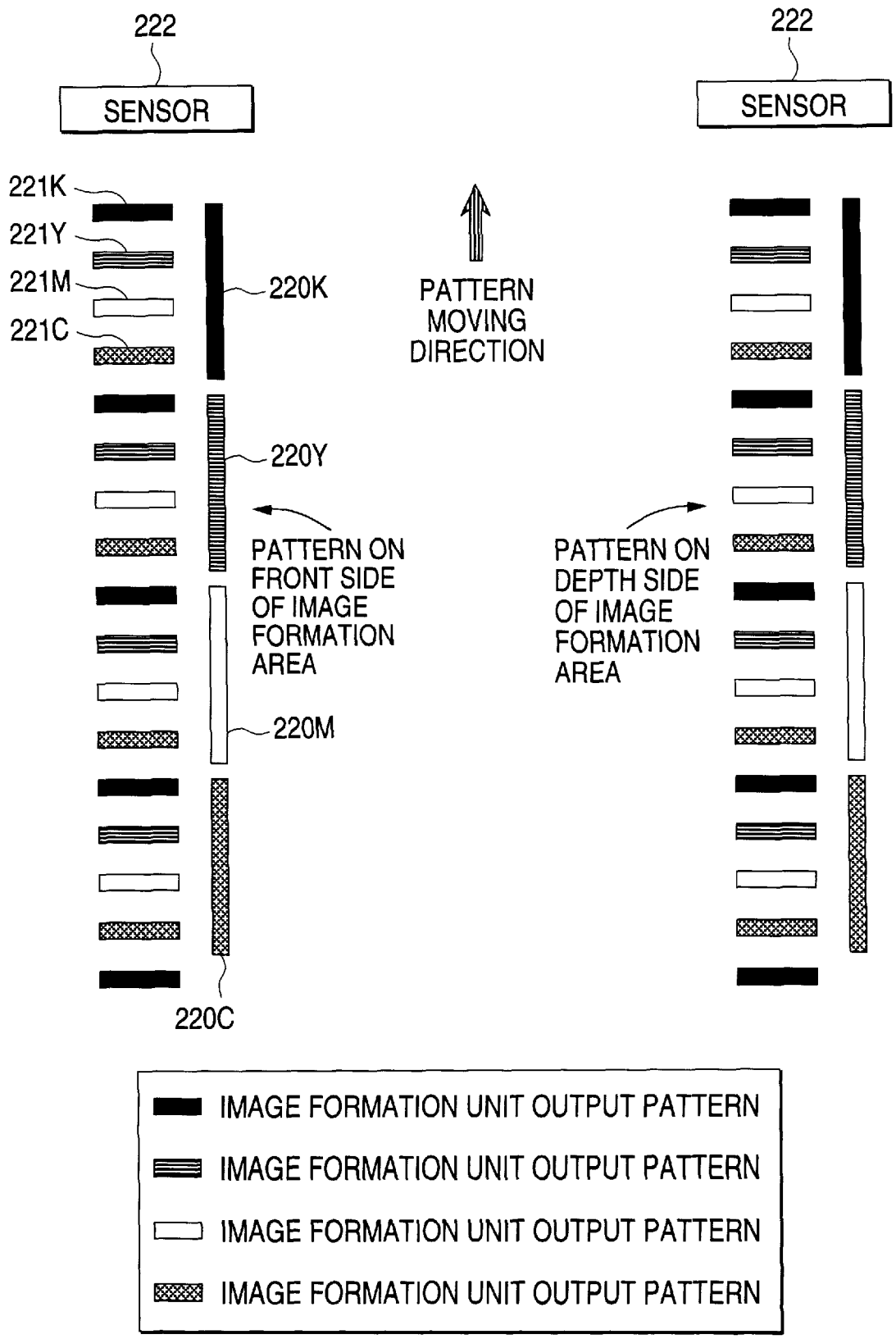
FIG. 33 is an illustration showing color shift detection patterns.

As shown in FIG. 31, DC color shift detection patterns 72 and the AC color shift detection patterns 110*a* (K) 110*a* (Y), 110*a* (M), and 110*a* (C) and 110*b* (K), 110*b* (Y), 110*b* (M), and 110*b* (C) may be formed in combination and be sampled separately. A large number of the AC color shift detection patterns 110*a* (K), 110*a* (Y), 110*a* (M), and 110*a* (C) and 110*b* (K), 110*b* (Y), 110*b* (M), and 110*b* (C) are also formed continuously along the move direction of the transfer belt 24 (for example, on the full periphery of the transfer belt 24) and are sampled.

In the embodiment, the AC color shift detection patterns 110 are formed continuously for each color and are sampled separately for each color. Thus, when the pattern 110 for each color is used, an AC component detection and correction cycle may be executed before a fine adjustment; it may also be executed before a rough adjustment of DC component.

The image formation system according to the invention provides the color shift detection patterns 110 for detecting cyclic rotation change occurring in the image formation system. Thus, even if the color shift detection patterns are formed under limited conditions, cyclic rotation change occurring in the image formation system may be considered to form the color shift detection patterns. An AC color registration shift can be detected with good accuracy according to the color shift detection patterns for detecting cyclic rotation change occurring in the image formation system, and sufficient data as information for actively controlling the drive system of the rotation bodies such as the photosensitive drums and the transfer belt and reducing the AC color registration shift can be provided.

The image formation system according to the invention has a plurality of sets of the color shift detection patterns. Thus, even if there are a plurality of cyclic rotation changes occurring in the image formation system, they can be detected with good accuracy according to the color shift detection patterns.

On the other hand, the image formation system according to the invention has only one set of the color shift detection patterns for sampling the single color shift detection pattern at a plurality of sampling frequencies. Thus, only one color shift detection pattern set may be formed and color shift detection pattern formation can be executed easily.

In the image formation system according to the invention, the spacing between the color shift detection patterns in the move direction of the endless support is set corresponding to the frequency of cyclic rotation change occurring in the image formation system. Thus, cyclic rotation change occurring in the image formation system can be detected with good accuracy according to the color shift detection patterns matching the rotation change.

In the image formation system according to the invention, the sampling frequency of the color shift detection pattern is set corresponding to the frequency of the rotation change to be detected among cyclic rotation changes occurring in the image formation system. Thus, even if there are a plurality of cyclic rotation changes occurring in the image formation system, a specific cyclic rotation change can be detected with good accuracy.

In the image formation system according to the invention, the sampling frequency of the color shift detection pattern is set corresponding to higher-frequency rotation change among cyclic rotation changes occurring in the image formation system. Thus, as seen from the sampling theorem, only low-frequency rotation change can be detected without detecting high-frequency rotation change.

In the image formation system according to the invention, the color shift detection patterns consist of patterns repeatedly formed in a predetermined spacing along the move direction of the endless support and patterns formed in a direction perpendicular to the move direction of the endless support and the patterns formed along the move direction of the endless support and the patterns formed in the direction perpendicular to the move direction of the endless support are sampled separately. Thus, the patterns in the move direction of the endless support and the patterns in the direction perpendicular to the move direction are sampled separately, whereby even if the pattern spacing along the move direction of the endless support is narrow, sufficient data processing time can be provided.

In the image formation system according to the invention, the color shift detection patterns are sampled separately for each color. Thus, the pattern spacing of each color can be set narrow and even if the frequency of cyclic rotation change occurring in the image formation system is high, the rotation change can be changed with good accuracy.

In the image formation system according to the invention, the color shift detection patterns are sampled after the termination of at least either of rough and fine adjustments of a DC color registration correction cycle just after power of the system is turned on. Thus, when an AC color registration shift is detected, at least the rough adjustment of the DC color registration correction cycle terminates. The color shift detection patterns for detecting cyclic rotation change occurring in the image formation system can be formed with good accuracy and the color shift detection patterns can be reliably prevented from overlapping each other. Further, if the AC color shift detection pattern sampling and correction cycle is performed between rough and fine adjustments in the DC color registration correction cycle just after the system power is turned on, the subsequent fine adjustment in the DC color registration correction cycle can be made with good accuracy.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image formation system for forming a plurality of images different in color on a transfer material, comprising:
   an endless support on which the transfer material is supported;
   means for rotationally driving said endless support;
   color shift detection patterns formed on said endless support for detecting cyclic rotation change occurring in said image formation system;
   means for sampling the color shift detection patterns at a plurality of sampling frequencies; and
   means for performing predetermined control operation according to a sampling result from said sampling means.

2. The image formation system as claimed in claim 1 wherein said color shift detection patterns comprise a plurality of sets of the color shift detection patterns.

3. The image formation system as claimed in claim 1 wherein said color shift detection patterns comprise only one set of the color shift detection patterns for sampling the single color shift detection pattern at a plurality of sampling frequencies.

4. The image formation system as claimed in claims 1, wherein spacing between said color shift detection patterns in a move direction of said endless support is set corresponding to frequency of cyclic rotation change occurring in said image formation system.

5. The image formation system as claimed in claim 1, wherein sampling frequency of said color shift detection patterns is set corresponding to frequency of rotation change to be detected among cyclic rotation changes occurring in said image formation system.

6. The image formation system as claimed in claim 1, wherein sampling frequency of said color shift detection patterns is set corresponding to higher-frequency rotation change among cyclic rotation changes occurring in said image formation system.

7. The image formation system as claimed in claim 1, wherein said color shift detection patterns comprise patterns repeatedly formed in a predetermined spacing along a move direction of said endless support and patterns formed in a direction perpendicular to the move direction of said endless support and wherein the patterns formed along the move direction of said endless support and the patterns formed in the direction perpendicular to the move direction of said endless support are sampled separately.

8. The image formation system as claimed in claim 1, wherein said color shift detection patterns are sampled separately for each color.

9. The image formation system as claimed in claim 1 wherein said color shift detection patterns are sampled after termination of at least either of rough and fine adjustments of a DC color registration correction cycle just after power of said system is turned on.

* * * * *